(12) United States Patent
Nakamura

(10) Patent No.: US 7,884,956 B2
(45) Date of Patent: Feb. 8, 2011

(54) NETWORK FACSIMILE SYSTEM

(75) Inventor: Michihiro Nakamura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1400 days.

(21) Appl. No.: 11/064,929

(22) Filed: Feb. 25, 2005

(65) Prior Publication Data

US 2005/0190402 A1 Sep. 1, 2005

(30) Foreign Application Priority Data

Feb. 27, 2004 (JP) ............................. 2004-054217

(51) Int. Cl.
*G06F 3/12* (2006.01)
*H04N 1/00* (2006.01)

(52) U.S. Cl. .................... 358/1.15; 358/400; 358/403; 358/407

(58) Field of Classification Search ................ 358/1.15, 358/440, 437, 434, 407, 400, 408, 462, 468; 709/206; 379/100.06, 100.09, 100.12
See application file for complete search history.

(56) References Cited

U.S. PATENT DOCUMENTS

| | | | |
|---|---|---|---|
| 5,425,081 A * | 6/1995 | Gordon et al. ......... | 379/100.04 |
| 5,657,381 A | 8/1997 | Hughes-Hartogs | |
| 5,854,829 A | 12/1998 | Hughes-Hartogs | |
| 6,088,125 A | 7/2000 | Okada et al. | |
| 6,141,111 A * | 10/2000 | Kato ........................ | 358/1.15 |
| 6,157,945 A | 12/2000 | Balma et al. | |
| 6,230,189 B1 | 5/2001 | Sato et al. | |
| 6,266,160 B1 * | 7/2001 | Saito et al. .................. | 358/407 |
| 6,389,121 B1 * | 5/2002 | Terao ..................... | 379/100.08 |
| 6,411,393 B1 | 6/2002 | Wakasugi | |
| 6,650,440 B1 | 11/2003 | Wing | |
| 6,727,998 B1 * | 4/2004 | Tomiyasu .................. | 358/1.15 |
| 6,816,911 B1 * | 11/2004 | Toyoda et al. ............... | 709/238 |
| 6,825,955 B1 * | 11/2004 | Shibata ....................... | 358/402 |
| 6,914,693 B1 * | 7/2005 | Kirkeby ..................... | 358/1.15 |
| 6,932,523 B1 * | 8/2005 | Yamada et al. ............... | 400/78 |
| 7,016,058 B1 * | 3/2006 | Tabata ....................... | 358/1.15 |

(Continued)

FOREIGN PATENT DOCUMENTS

CN 1185883 A 6/1998

(Continued)

OTHER PUBLICATIONS

Patent Abstracts of Japan, Publication No. 06164645, Publication Date Jun. 10, 1994.

(Continued)

*Primary Examiner*—James A Thompson
(74) *Attorney, Agent, or Firm*—Banner & Witcoff, Ltd.

(57) ABSTRACT

A network facsimile system is configured such that telephone numbers which a relay server can user are assigned to communication terminals. When a image is transmitted from the communication terminals to destinations outside the network facsimile system via the relaying server, the assigned telephone numbers are used as station signal numbers. When an image is transmitted to the relaying server from origins outside the network facsimile system, destination communication terminals are identified based on the telephone numbers assigned thereto and receiving telephone numbers. Then, the image received by the relaying server is transmitted to the identified communication terminals.

30 Claims, 27 Drawing Sheets

U.S. PATENT DOCUMENTS

| | | |
|---|---|---|
| 7,167,264 B2 * | 1/2007 | Takamiya .................. 358/1.15 |
| 7,199,906 B1 | 4/2007 | Tamura |
| 2002/0069254 A1 | 6/2002 | Watanabe et al. |
| 2002/0120699 A1 | 8/2002 | Wakabayashi |
| 2002/0131069 A1 * | 9/2002 | Wanda ...................... 358/1.14 |
| 2003/0048484 A1 | 3/2003 | Seki et al. |
| 2003/0197890 A1 * | 10/2003 | Satake et al. ............... 358/1.15 |
| 2004/0169882 A1 * | 9/2004 | Tenenbaum et al. ........ 358/1.15 |
| 2005/0068566 A1 * | 3/2005 | Nishiguchi ................. 358/1.15 |
| 2005/0190403 A1 | 9/2005 | Nakamura |
| 2005/0190404 A1 | 9/2005 | Nakamura |
| 2006/0268349 A1 | 11/2006 | Tamura |

FOREIGN PATENT DOCUMENTS

| | | |
|---|---|---|
| EP | 0 615 377 A2 | 9/1994 |
| EP | 0 848 539 A1 | 6/1998 |
| EP | 1081934 | 3/2001 |
| EP | 1271916 | 1/2003 |
| EP | 1294173 | 3/2003 |
| JP | 06-097926 A | 2/1994 |
| JP | 6-164645 | 6/1994 |
| JP | 6-268831 | 9/1994 |
| JP | 08-335999 | 12/1996 |
| JP | 08-3404403 | 12/1996 |
| JP | 10-093794 | 4/1998 |
| JP | 11-017876 A | 1/1999 |
| JP | 11-068833 | 3/1999 |
| JP | 11-177614 | 7/1999 |
| JP | 2000-004252 A | 1/2000 |
| JP | 2000-041063 | 2/2000 |
| JP | 2000-165435 A | 6/2000 |
| JP | 2001-147873 A | 5/2001 |
| JP | 2001-292157 A | 10/2001 |
| JP | 2001-308931 A | 11/2001 |
| JP | 2001-326673 A | 11/2001 |
| JP | 2002-009811 A | 1/2002 |
| JP | 2002-111936 A | 4/2002 |
| JP | 2002-124973 A | 4/2002 |
| JP | 2002-171291 | 6/2002 |
| JP | 2002-199150 | 7/2002 |
| JP | 2003-084945 | 3/2003 |
| JP | 2003-174548 A | 6/2003 |
| JP | 2003-309604 A | 10/2003 |

OTHER PUBLICATIONS

Patent Abstracts of Japan, Publication No. 2002199150, Publication Date Jul. 12, 2002.

Notice on First Office Action in Chinese Application No. 200510071601.2 dated May 18, 2007.

Notification of Reasons of Rejection in Japanese Application No. 2004054217 dated Jul. 24, 2007.

Notification of Reasons of Rejection in Japanese Application No. 2004054218 dated Jul. 24, 2007.

Notifications for Reasons of Rejection dated Sep. 11, 2007 in Japanese Application No. 2004-054216 and English translation thereof.

* cited by examiner

FIG.17A

E-MAIL ADDRESS MANAGEMENT TABLE

| TELEPHONE NUMBER | E-MAIL ADDRESS | IP ADDRESS | ROOM NUMBER |
|---|---|---|---|
| 0528765432 | IFAX1@br.co.jp | 192.168.19.11 | 1101 |
| 0521234567 | IFAX2@br.co.jp | 192.168.19.12 | 1102 |
|  |  | 192.168.19.13 | 1103 |
|  |  |  |  |

FIG.17B

TELEPHONE NUMBER USAGE TABLE

| TELEPHONE NUMBER | E-MAIL ADDRESS | STATUS |
|---|---|---|
| 0528765432 | IFAX1@br.co.jp | USED |
| 0521234567 | IFAX2@br.co.jp | USED |
| 0528765555 | IFAX3@br.co.jp | UNUSED |
| 0521234444 | IFAX4@br.co.jp | UNUSED |
|  |  |  |

FIG.17C

CHECK-IN MANAGEMENT TABLE

| ROOM NUMBER | STATUS |
|---|---|
| 1101 | CHECK-IN |
| 1102 | CHECK-IN |
| 1103 | CHECK-OUT |
|  |  |

FIG.18

From: IFAX1@br. co. jp
To: <FAX_SERVER@br. co. jp (FAX#0312345678)>
Subject: Internet FAX Job
DATE: Mon, 20 Jan 2003 13:21:19 -0500
Message-Id:<00000001. 2b5d51cf. 1. 00@BRN_220020>
Mime-Version: 1.0
Content-Type: multipart/mixed;
          boundary="---+--Br InternetFax--+--"
X-UIDL: 9764c5c13e8fc6c0c447f27dee52d08e This is multipart message.

----+--Br InternetFax--++--
Content-Type: text/plain; charset=us-ascii

Image data in TIFF-F format has been attached.
----+--Br InternetFax--++--
Content-Type: Image/tiff;
          name="image. tif"
Content-Transfer-Encoding: base64

Base64 CONVERTED DATA

----+--BR InternetFax--++----

FIG.19

From: FAX_SERVER@br. co. jp
To: IFAX1@br. co. jp
Subject: FAX SEND END[OK]

NUMBER:0312345678
TIME:75
PAGE:2
RESULT: OK
CODEC:MH
ECM:NO
- 
- 
-

FIG.20

| | |
|---|---|
| [FAX TRANSMISSION RESULT] | |
| OID: | 1. 3. 6. 1. 4. 1. *. 1 |
| Value: | 1:FAX send OK |
| | 9:FAX send NG |
| [FAX TRANSMISSION DESTINATION] | |
| OID: | 1. 3. 6. 1. 4. 1. *. 2 |
| Value: | TELEPHONE NUMBER |
| [FAX TRANSMISSION TIME] | |
| OID: | 1. 3. 6. 1. 4. 1. *. 3 |
| Value: | PERIOD(second) |
| [FAX TRANSMITTED PAGES] | |
| OID: | 1. 3. 6. 1. 4. 1. *. 4 |
| Value: | THE NUMBER OF PAGES |
| [FAX ENCODING METHOD] | |
| OID: | 1. 3. 6. 1. 4. 1. *. 5 |
| Value: | 1:MH |
| | 2:MR |
| | 3:MMR |
| | 4:JBIG |
| | 5:JPEG |
| [ECM] | |
| OID: | 1. 3. 6. 1. 4. 1. *. 6 |
| Value: | 1:YES |
| | 9:NO |

FIG.21

| | |
|---|---|
| Source Port: | 58*** |
| Destination Port: | 58*** |
| Data: | \|A\|1101\|192. 168. 19. 11\| |

FIG.28

| NO. | DATA | TIME | FAX NO./NAME | DURATION | PAGE(S) | RESULT | COMMENT |
|---|---|---|---|---|---|---|---|
| #001 | 12/15 | 10:00 | 938218233345 | 10:30 | 20 | OK | TX ECM |
| #002 | 12/15 | 10:12 | 223455855859 | 01:30 | 01 | OK | TX |
| #003 | 12/15 | 10:15 | 12378965421 | 03:45 | 05 | ERROR | TX |
| #004 | 12/15 | 10:20 | 548737748293 | 11:33 | 10 | OK | RX |
|  | 12/15 | 10:33 | 203000493845 | 30 | 01 | OK | TX |
| #005 | 12/15 | 11/25 | 0323324321 | 00 | 00 | BUSY | TX |

NETWORK FACSIMILE SYSTEM

INCORPORATION BY REFERENCE

This application claims priority from Japanese Patent Application No. 2004-054217, filed on Feb. 27, 2004, the entire subject matters of the application are incorporated herein by reference thereto.

BACKGROUND OF THE INVENTION

1. Technical Field

Aspects of the present invention relate to a network facsimile system that transmits/received images to/from an external device in accordance with a facsimile data transmission protocol.

2. Related Art

Conventionally, a facsimile system in which a facsimile image is transmitted from an origin station to a destination station via a relaying server has been known. In such a system, the relaying server receives the facsimile image from the origin station and transmits the same to the destination station.

Japanese Patent Provisional Publication No. HEI 6-164645 discloses a system in which facsimile data is transmitted as an e-mail message. According to the publication, at an origin station (facsimile terminal), a sub address corresponding to a destination station is input. The relaying server identifies the destination based on the sub address, and transmits the facsimile data to the destination as identified.

U.S. Pat. No. 6,230,189 B1 discloses a similar system.

Japanese Patent Provisional Publication No. P2002-199150A discloses a system for transmitting facsimile images among devices of which telephone numbers and e-mail addresses are registered in advance. A destination and/or a relaying server is identified based on the registered information, and the facsimile images are transmitted to the thus identified destination and/or relaying server.

In the normal facsimile system, the user at the origin station only need to input the telephone number of the destination to send a facsimile transmission. On the contrary, in the conventional network facsimile systems, the users of the origin station and destination station cannot use the network facsimile system similar to a case where the normal facsimile machines are use. That is, the user of the origin station has to input the sub addresses or the user at the origin station and/or the user at the destination station is required to perform some preparation settings. For example, registration of the information (telephone number, e-mail address etc.) of the origin station and/or destination station should be done in advance.

As above, according to the conventional network facsimile system, the users need to take the existence of the relaying server into account when transmitting facsimile images.

SUMMARY OF THE INVENTION

Aspects of the present invention are advantageous in that, in a network facsimile system employing a relaying server through which facsimile images are transmitted from an origin station to a destination station, "transparency" of the relaying server can be realized. Thus, users of the origin station and the destination station can use the network facsimile system as a normal facsimile system using the facsimile machines connected through the telephone line. These and other aspects of the invention are described below.

BRIEF DESCRIPTION OF THE ACCOMPANYING DRAWINGS

FIGS. 17A-17C show tables managed by the facsimile relaying server in accordance with aspects of the present invention.

FIG. 18 shows an example of an e-mail message for a facsimile transmission in accordance with aspects of the present invention.

FIG. 19 shows an example of notifying a completion of a facsimile transmission in accordance with aspects of the present invention.

FIG. 20 shows a configuration of a managed information base for notifying the completion of a facsimile transmission in accordance with aspects of the present invention.

FIG. 21 shows an example of data to UDP broadcast room number and IP address for a user in accordance with aspects of the present invention.

FIG. 28 shows an example of a transmission management report in accordance with aspects of the present invention.

DETAILED DESCRIPTION OF THE EMBODIMENTS

Figure 1:
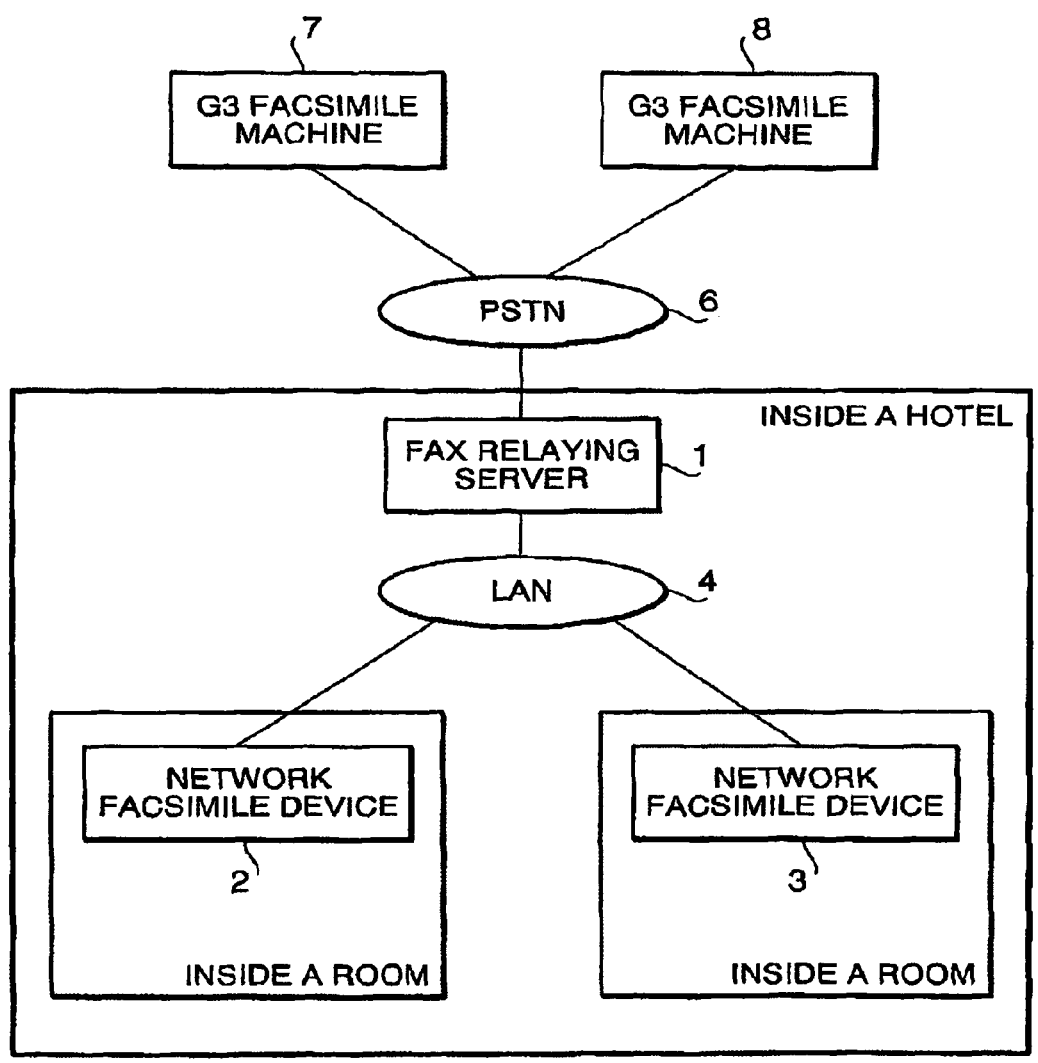
FIG. 1 is a block diagram showing an entire configuration of a network facsimile system according to an embodiment of the present invention.

General Overview of Aspects of the Invention

The following describes general aspects of the invention that may or may nor be included in various embodiments. Also, it is noted that various connections are set forth between elements in the following description. It is noted that these connections in general and, unless specified otherwise, may be direct or indirect and that his specification is not intended to be limiting in this respect.

According to an aspect of the invention, there is provided a network facsimile system which is configured such that an image transmitted from an origin outside the network facsimile system is received by a relaying server, the relaying server being capable of transmitting the image to one of a plurality of communication terminals, the image being transmitted from the origin outside the network facsimile system to the relaying server in accordance with a facsimile communication protocol, the image being transmitted from the relaying server to the communication terminal in accordance with a predetermined communication protocol. The relaying server may include a facsimile communication system capable of receiving facsimile data representing the image transmitted from the origin outside the network facsimile system, an image data creating system that creates image data which can be processed by the communication terminal based on the facsimile data received by the facsimile communication system, a destination identifying system that identifies a communication terminal which is a destination from among the plurality of communication terminals, and a relaying server side data communication system that transmits the image data created by the image data creating system to the communication terminal identified by the destination identifying system. Further, the communication terminal may include a communication terminal side data communicating system that receives the image data transmitted from the relaying server side data communication system, and an image data processing system that processes the image data received by the communication terminal side data communication system to one of print and store in a storing system. Furthermore, the network facsimile system nay include a communication terminal data storing a plurality of pieces of communication terminal data corresponding to the plurality of communication terminals. The facsimile communication system may have a plurality of telephone numbers which are used as receiving telephone numbers when the facsimile data is received. Selected ones of the plurality of telephone numbers of the facsimile communication system may be assigned to the plurality of communication terminals, respectively, the communication terminal data including the telephone number assigned to each communication terminal is stored in the communication terminal data storing system. The destination identifying system may detect the communication terminal data including the reception telephone number when the facsimile communication system receives the facsimile data from among the communication terminal data of the plurality of communication terminals, and identifies a communication terminal serving as the destination based on the communication terminal data.

Optionally, the communication terminal data storing system may store communication terminal data including e-mail addresses respectively assigned to the plurality of communication terminals. The destination identifying system may detect the communication terminal data including the reception telephone number when the facsimile communication system received the facsimile data from among the plurality of pieces of the communication terminal data stored in the communication terminal data storing system, and obtains the e-mail address contained in the detected communication terminal data. Further, the relaying server side data communication system may transmit the image data created by the image data creating system to the address obtained by the destination identifying system by e-mail.

Optionally, the communication terminal data storing system stores communication terminal data including network addresses respectively assigned to the plurality of communication terminals. The destination identifying system may detect the communication terminal data including the reception telephone number when the facsimile communication system received the facsimile data from among the plurality of pieces of the communication terminal data stored in the communication terminal data storing system, and obtains the network address contained in the deleted communication terminal data, and the relaying server side data communication system may transmit the image data created by the image data creating system to the network address obtained by the destination identifying system in accordance with a packet communication protocol.

In a particular case, the communication terminal data storing system is provided to the relaying server.

According to another aspect of the invention, there is provided a network facsimile system having a plurality of communication terminals and relaying server, the relaying server receiving an image transmitted from one of the plurality of communication terminals, the relaying server being capable of transmitting the received image to a destination outside the network facsimile system, the one of the plurality of communication terminals transmitting the image to the relaying server in accordance with a predetermined communication protocol, the relaying server transmitting the image to the destination outside the network facsimile system in accordance with a facsimile transmission protocol. Each of the communication terminals may include an image data creating system that creates image data representing the image to be transmitted, and a communication terminal side data communication system that transmits the image data created by the image data creating system to the relaying server. Further, the relaying server may be provided with a relaying server side data communication system that receives the image data transmitted form the communication terminal side data communication system, a facsimile data creating system that creates facsimile data to transmits the image in accordance with the facsimile communication protocol based on the image data received by the relaying server side data communication system, and a facsimile communication system that transmits the facsimile data created by the facsimile data creating system to the destination outside the network facsimile system in accordance with the facsimile communication protocol. In this case, the network facsimile system may include a communication terminal data storing system that stores a plurality of pieces of communication terminal data respectively corresponding to the plurality of communication terminals, and the facsimile communication system may include a plurality of telephone numbers used as transmitting station numbers when the facsimile data is transmitted. Further, selected numbers of the plurality of telephone numbers may; be assigned to the plurality of communication terminals, respectively, each of the plurality of pieces of the communication terminal data containing the telephone number assigned to each communication terminal is stored in the communication terminal data storing system. The relaying server may be provided with a telephone number extracting system that detects the communication terminal data corresponding to the communication terminal that is an origin of the image data received by the relaying server side data communication system from among the plurality of pieces of communication terminal data stored in the communication terminal storing system, and then extracts a telephone number from the communication terminal data as detected, and the facsimile communication system transmits the facsimile data created by the facsimile data crating system to the destination outside the network facsimile system using the telephone number extracted by the telephone number extracting system from amount the plurality of telephone numbers the facsimile communication system includes as the transmitting station number in accordance with the facsimile communication protocol.

Optionally, the communication terminal data storing system may store communication terminal data including e-mail addresses respectively assigned to the plurality of communication terminals. In this case, the telephone number extracting system may extract the origin station e-mail address of the e-mail when the relaying server side data communication system receives the image data transmitted form the communication terminal in accordance with the email communication protocol, detects the communication terminal data including the extracted origin station e-mail address from the plurality of pieces of communication terminal data stored in the communication terminal data storing system, and extracts the telephone number contained in the detected communication terminal data.

Further optionally, the facsimile communication system may be configured such that, if the image data is transmitted from more than one communication terminals and the facsimile data creating system creates more than one piece of facsimile data, the facsimile communication system executes data transmitting procedures for transmitting the more than one piece of facsimile data in parallel.

In a particular case, the relaying server side data communication system may be configured such that, if the image data is transmitted from more than one communication terminals, the relaying server side data communication system executes data receiving procedures for the more then one piece of image data in parallel.

Still optionally, the relaying server may include a telephone number assigning system that assigns a telephone number to the communication terminal by extracting one telephone number form the plurality of telephone numbers the facsimile communication system includes, and storing the extracted telephone number in a piece of communication terminal data corresponding to the communication terminal subject to the assignment if there is a communication terminal to which the telephone number is assigned.

Further, the relaying server may include a telephone number availability storing system that stores the availability of each of the telephone numbers the facsimile communication system includes, and the telephone number assigning system may extract one of the telephone numbers, which are included in the facsimile communication system and whose availabilities in the availability stored in the telephone number availability storing system are available, and assigns the selected one of the telephone numbers to the selected communication terminal by storing the selected one of the telephone numbers in the piece of the communication terminal data corresponding to the selected communication terminal.

Further optionally, the telephone numbers assigning system may store unavailability of the telephone number assigned to the selected communication terminal in the telephone number availability storing system when the telephone number is assigned to the communication terminal.

When an assignment of a telephone numbers to a communication terminal is released, the telephone number assigning system may store availability of the released telephone number after the assignment is released.

Optionally, the relaying server may include a communication terminal availability judging system that judges whether each communication terminal is usable, and the telephone number assigning system may assign a telephone number to the communication terminal which is judged to be usable by the communication terminal availability judging system.

Optionally, the relaying server may include a usage detecting system that detects a start-up of each communication terminal, and the communication terminal availability judging system may determine that a communication terminal becomes usable when the start-up detecting system detects the start-up of the communication terminal.

Further optionally, the communication terminal data storing system may store a plurality of pieces of communication terminal data including location data indicating locations of the plurality of communication terminals, respectively. The relaying server may include a location availability setting system capable of setting the availability of the locations of the plurality of communication terminals, respectively, the communication terminal usage judging system may determine that, when a location of a communication terminal is set to be occupied by the location availability setting system, the communication terminal at the location becomes usable, and the telephone number assigning system may detect, based on the location data indicating the communication terminal which is determined to be usable by the communication terminal usage judging system, the communication terminal data including the location data from among the plurality of pieces of communication terminal data stored in the communication terminal data storing system, and assigns a telephone number to the communication terminal by storing the extracted telephone number in the communication terminal data.

Further optionally, the relaying server may include a communication terminal unavailability judging system that judges whether each communication terminal is not being used, and the telephone number assigning system may detect the communication terminal data corresponding to the communication terminal which is determined not to be used by the communication terminal unavailability judging system from among the plurality of pieces of the communication terminal data stored in the communication terminal data storing system, and release the assignment of the telephone number to the communication terminal by invalidating the stored telephone number in the detected communication terminal data.

Further optionally, the communication terminal data storing system may be configured to store a plurality of pieces of communication terminal data including location data indicating locations of the plurality of communication terminals, respectively, and the relaying server may include a location availability setting system capable of setting the availability of the locations of the plurality of communication terminals, respectively. The communication terminal usage judging system may determine that, when a location of a communication terminal is set to be unoccupied by the location availability setting system the communication terminal at the location becomes unused. Further, the telephone number assigning system may detect, based on the location data indicating the communication terminal which is determined to be unused by the communication terminal usage judging system, the communication terminal data including the location data from among the plurality of pieces of communication terminal data stored in the communication terminal data storing system, and releases a telephone number assigned to the communication terminal by invalidating the telephone number in the detected communication terminal data.

Still optionally, the relaying server may include an e-mail address assigning system, the e-mail address assigning system operates, when a communication terminal to which an e-mail address is to be assigned is available, to extract one e-mail address from among a plurality of e-mail addresses prepared for assigning to the plurality of communication terminals, the e-mail address assigning system assigning the extracted e-mail address to the communication terminal by storing the extracted e-mail address in the communication terminal data corresponding to the communication terminal to which the e-mail address is to be assigned.

Further, the relaying server may include an e-mail address usage storing system that stores whether a plurality of e-mail addresses assigned to the plurality of communication terminals are usable, respectively, and the e-mail address assigning system may extract one e-mail address from among the e-mail addresses which are indicated usable in the e-mail address usage storing system, and stores the extracted e-mail address in the communication terminal data corresponding to the selected communication terminal to assign the extracted e-mail address to the selected communication terminal.

In a particular case, the e-mail address assigning system may store, when the e-mail address is assigned to the communication terminal, an unusable state of the e-mail address as assigned in the e-mail address usage storing system.

Further, the e-mail address assigning system may store, when the assignment of the e-mail address to a communication terminal is released, a usable state of the e-mail address in the e-mail address usage storing system.

Further optionally, the relaying server may include a communication terminal availability judging system that judges whether each communication terminal is available, and the e-mail address assigning system may assign the e-mail address to each communication terminal that is deleted to be available by the communication terminal availability judging system.

Further, the relaying server may include a start-up detection system that detects a start-up of the communication terminal, and the communication terminal availability judging system may determine that a communication terminal is usable when the start-up of the communication terminal is detected by the start-up detection system.

Optionally, the communication terminal data storing system may store a plurality of pieces of communication terminal data including location data indicating locations of the plurality of communication terminals, respectively. The relaying server may include a location availability setting system capable of setting the availability of the locations of the plurality of communication terminals, respectively. Further, the communication terminal usage judging system may determine that, when a location of a communication terminal is set to be occupied by the location availability setting system, the communication terminal at the location becomes usable, and the e-mail address assigning system may detect, based on the location data indicating the communication terminal which is determined to be usable by the communication terminal usage judging system, the communication terminal data including the location data from among the plurality of pieces of communication terminal data stored in the communication terminal data storing system, and assigns an e-mail address to the communication terminal by storing the extracted e-mail address in the communication terminal data.

Still optionally, the relaying server may include a communication terminal unavailability judging system that judges whether each communication terminal is not being used. Further the e-mail address assigning system may detect the communication terminal data corresponding to the communication terminal which is determined not to be used by the communication terminal unavailability judging system from among the plurality of pieces of the communication terminal data stored in the communication terminal data storing system, and releases the assignment of the e-mail address to the communication terminal by invalidating the stored e-mail address in the detected communication terminal data.

In a particular case, the communication terminal data storing system may store a plurality of pieces of communication terminal data including location data indicating locations of the plurality of communication terminals, respectively. In this case, the relaying server may include a location availability setting system capable of setting the availability of the locations of the plurality of communication terminals, respectively, and the communication terminal usage judging system may determine that, when a location of a communication terminal is set to be unoccupied by the location availability setting system, the communication terminal at the location becomes unused. Further, the e-mail address assigning system may detect, based on the location data indicating the communication terminal which is determined to be unused by the communication terminal usage judging system, the communication terminal data including the location data from among the plurality of pieces of communication terminal data stored in the communication terminal data storing system, and releases the e-mail address assigned to the communication terminal by invalidating the e-mail address in the detected communication terminal data.

Optionally, the relaying server may include an e-mail address notifying system, and, when the e-mail address assigning system assigns an e-mail address to the communication terminal, the e-mail address notifying system notifies the communication terminal to which the e-mail address is assigned of the assigned e-mail address.

Further optionally, the relaying server may include an e-mail address release notifying system, and when the e-mail address assigned to the communication terminal is released, the e-mail address release notifying system notifies the communication terminal subject to the release of the e-mail address of the release of the e-mail address.

Referring now to the accompanying drawings, embodiments of the present invention will be described in detail.

First Embodiment

A network facsimile system according to a first embodiment will be described. The network facsimile system is a system employed in a hotel having a plurality of rooms. FIG. 1 is a block diagram showing an entire configuration of the network facsimile system.

As shown in FIG. 1, in the hotel, a facsimile relays server 1 (hereinafter, referred to as a FAX relaying server), network facsimile devices 2 and 3 are provided and are connected through a LAN (Local Area Network) 4 to constitute the network facsimiles system.

The FAX relaying server 1 is connected with a PSTN (public switched telephone networks) 6. Accordingly, the FAX relaying server 1 is capable of transmitting/receiving images to/from a facsimile machine (e.g., G3 facsimile machines 7 and 8) outside the network facsimile system.

It should be noted that there are a plurality of network facsimile devices, which are implemented in hotel rooms one for each. Since they have functionally the same, only two network facsimile devices 2 and 3 are shown in FIG. 1 for the brevity.

Figure 2:
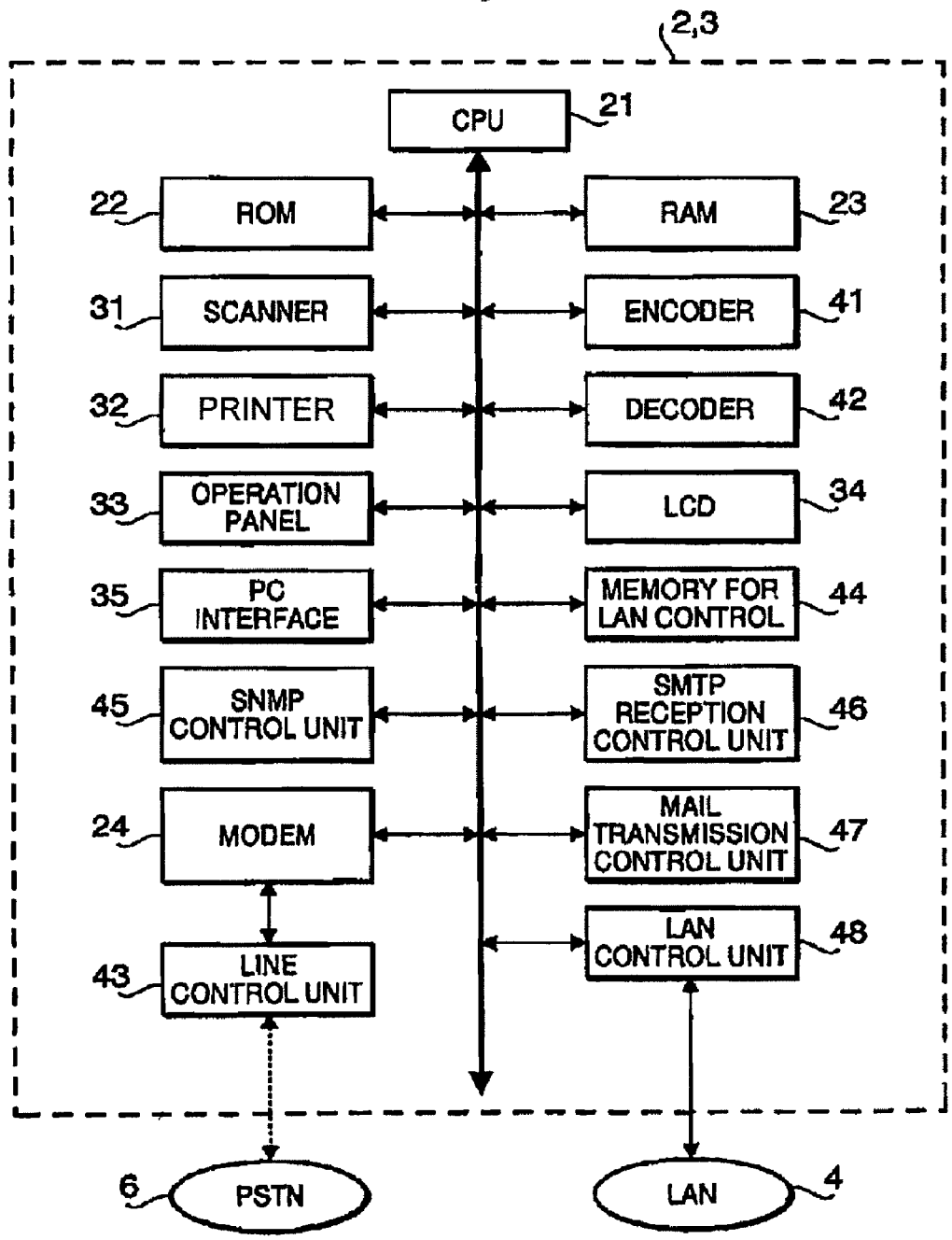
FIG. 2 is a block diagram showing a configuration of a control system of the network facsimile device shown in FIG. 1 in accordance with aspects of the present invention.

FIG. 2 is a block diagram showing a configuration of the control system of the network facsimile device 2 (or 3). Since the network facsimile devices 2 and 3 have the same configuration, only the network facsimile device 2 will be described. The description applies the network facsimile device 3 and other network facsimile devices (not shown) included in the network facsimile system.

The network facsimile device 2 includes a CPU 21 that controls an entire operation of the network facsimile device 2, a ROM 22 for storing various pieces of data, and a RAM 23 for temporarily storing various types of data dynamically generated during operation of the network facsimile device 2. The network facsimile device 2 further includes a MODEM 24 that converts digital data such as a facsimile image to analogue signal, and vice versa, a scanner 31 for capturing an image to be transmitted on an original, a printer 32 for printing an image, an operation panel 33 that is operated by a user when the user inputs commands to the network facsimile device 2. In the embodiment, the user who operates the operation panel 33 may be a user of a hotel room in which the network facsimile device 2 is implemented. The network facsimile device 2 is further provided with an LCD 34 capable of displaying messages and other visual information, a PC interface 35 such as a USB (Universal Serial Bus) port, an encoder 41 that encodes image data in accordance with a pre-determined encoding method such as MH/MR/MMR etc., and a decoder 42 that decodes the image data which has been encoded with the predetermined encoding method. The network facsimile device 2 further includes an LCU (Line Control Unit) 43 that controls communication through the PSTN 6, and a LAN control memory 44 for storing data necessary for communicating through the LAN 4. Further, the network facsimile device 2 includes an SNMP (Simple Network Management Protocol) control unit 45 that executes transmission/reception control in accordance with the SNMP and receives data indicative of operational status of the FAX relaying server 1, an SMTP (Simple Mail Transfer Protocol) reception control unit 46 that executes a mail receiving control in accordance with the SMTP to receive e-mail messages from the FAX relaying server 1, a mail transmission control unit 47 that executes a mail transmission control to transmits e-mail messages to the FAX relaying server 1, and a LAN control unit 48 that executes a communication control through the LAN 4.

It should be noted that network facsimile devices 2 and 3 are not dedicated devices which are used only as the network devices, but are general purpose devices which can also be used as normal facsimile machines that transmit/receive images through the PSTN 6. That is why the network facsimile device 2 (3) it provided with the MODEM 24 and LCU 43 and is configured to be connectable with the PSTN 6 (as indicated by broken line in FIG. 2).

When the network device 2 (3) is used as a communication device in the network facsimile system, it is unnecessary to connect the network facsimile device 2 with the PSTN 6. Therefore, according to the embodiment, the network facsimile devices 2 and 3 are connected only to the LAN 4, and are not connected with the PSTN 6. Accordingly, in each hotel room, equipment for connecting the network facsimile device 2 (3) to the PSTN need not be introduced.

Figure 3:
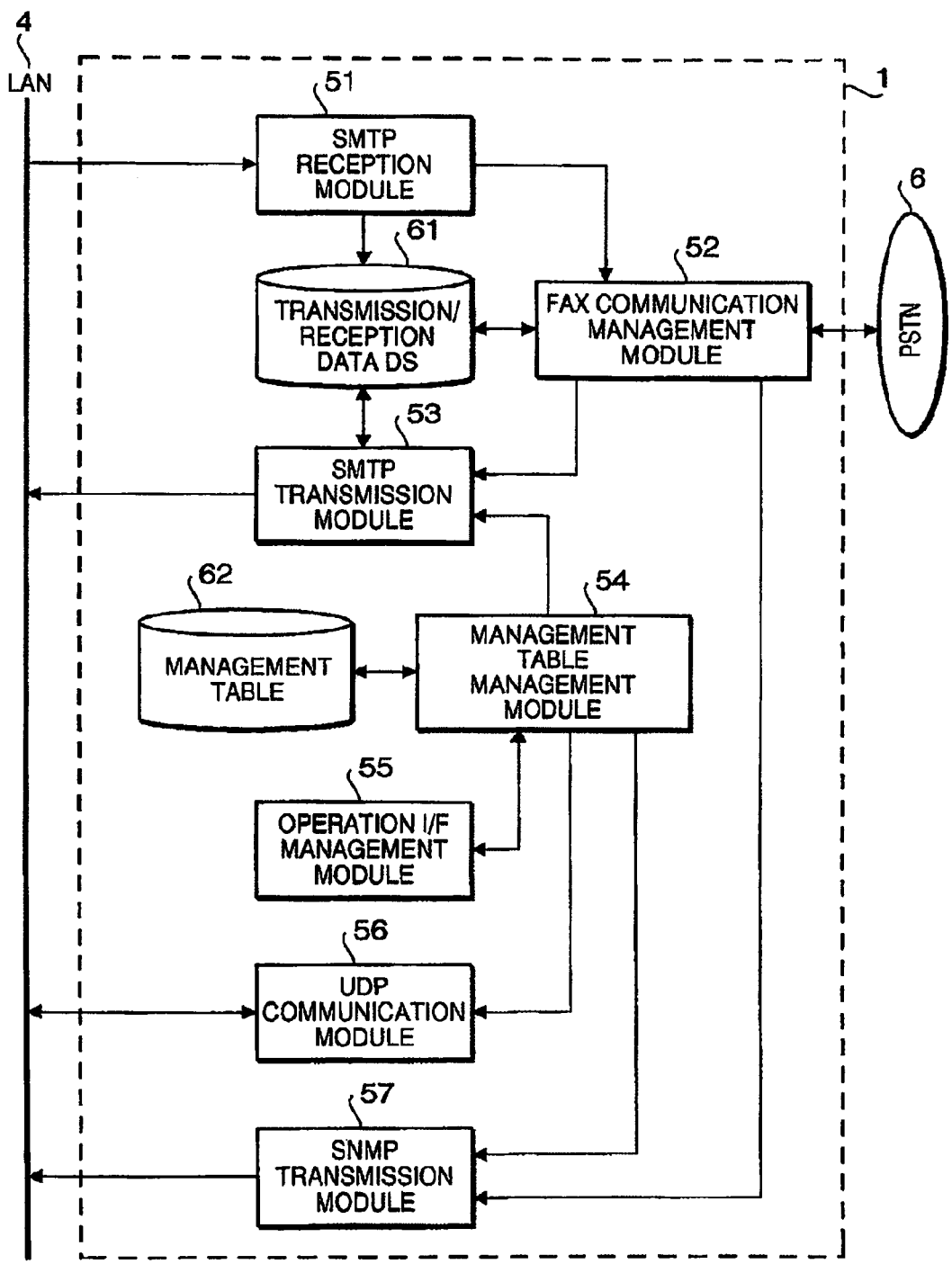
FIG. 3 is a block diagram showing a configuration of a control system of a facsimile relaying server shown in FIG. 1 in accordance with aspects of the present invention.
Figure 4:
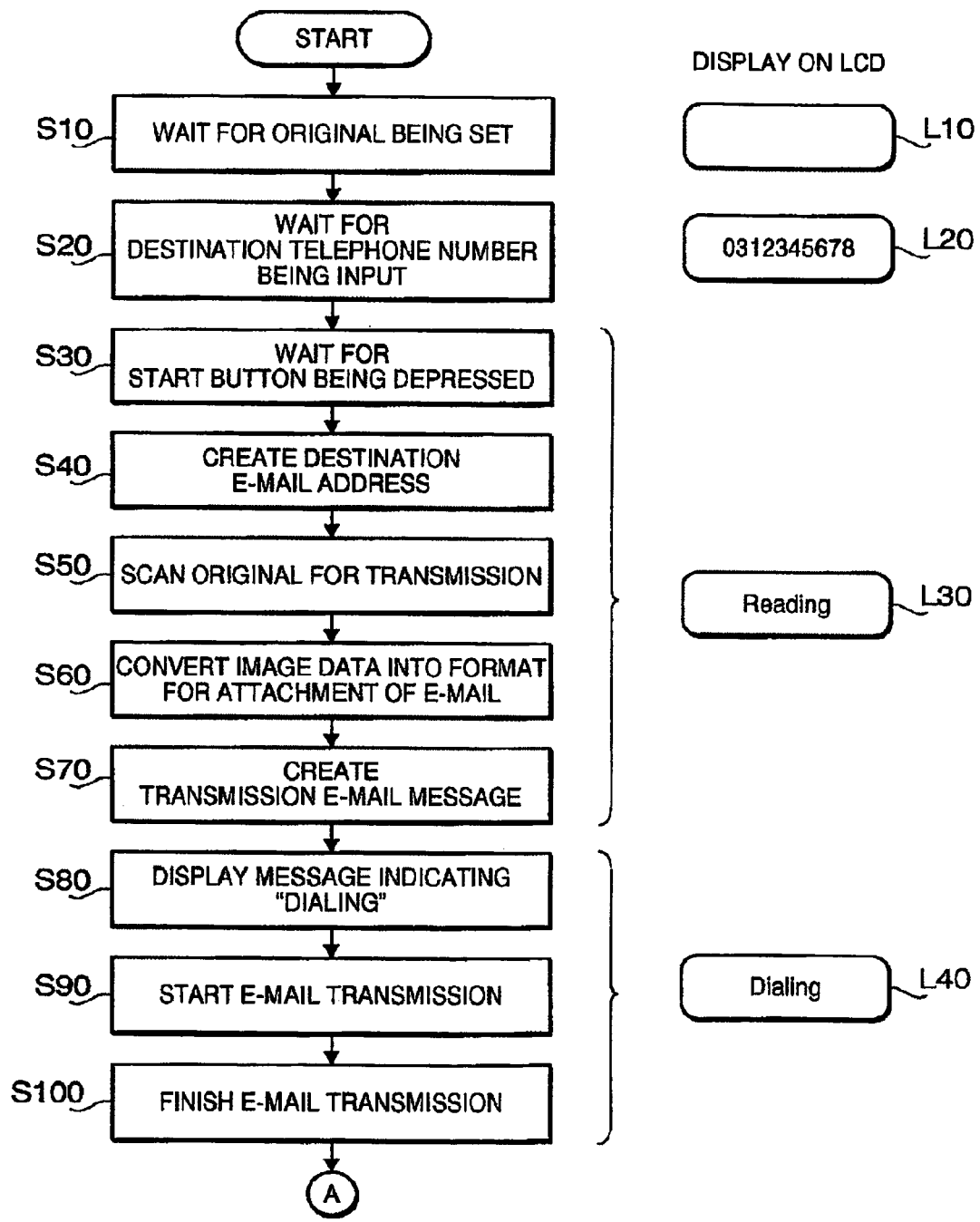
FIGS. 4 through 7 show a flowchart illustrating a network facsimile side transmission procedure executed in the network facsimile device in accordance with aspects of the present invention.
Figure 5:
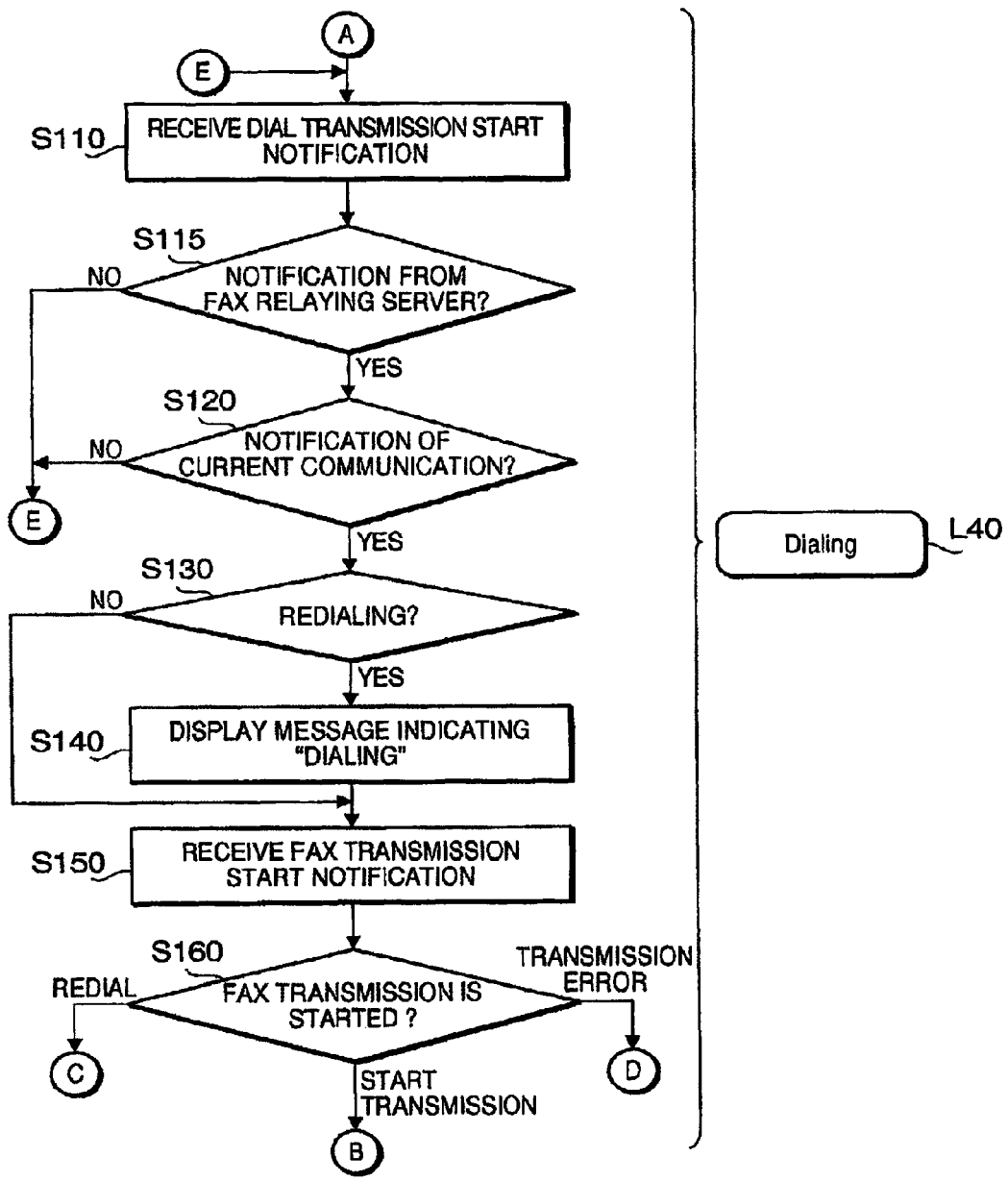

FIG. 3 is a block diagram showing a functional configuration of the FAX relaying sever 1.

The FAX relaying server 1 includes a personal computer (or a workstation), which is provided with a control unit having CPU, ROM and RAM, an input unit having a keyboard and pointing device, an output unit having a display, a storage device such as an HDD (Hard Disk Drive), a network I/F for connection with the LAN 4, other hardware including a MODEM for connection with the PSTN 6 and software including OS (Operating System) and various application programs. With combinations of the units, hardware and software above, an SMTP receiving module 51, a FAX communication management module 52, an SMTP transmission module 53, a table management module 54, an operation IF management module 55, a UDP communication module 56, and SNMP transmission module 57 are configured. The storage device of the FAX relaying server stores a group of files including transmission/reception data DB 61, management table 62, and the like.

The SMTP receiving modulo 51 executes a mail receiving control in accordance with the SMTP and receives e-mails messages from the mail transmission control unit 47 of the network facsimile device 2 (3). The e-mail messages as received are stored in the transmitted/received data DB 61.

The FAX communication management module 52 converts an image represented by image data contained in the e-mail messages which is received from the network facsimile device 2 (3) and stored in the transmitted/received data DB 61, to facsimile data which is transmitted in accordance with the facsimile communication protocol. Then, the FAX communication management module 52 transmits the converted data (i.e., the facsimile data) to the PSTN 6. Further, the FAX communication management module 52 converts the image represented by the facsimile data received through the PSTN 6 into image data which can be processed by the network facsimile device 2 (3) and stores the converted image data in the transmitted/received data DB 61.

The SMTP transmission module 53 transmits an e-mail message to which the image data, which has been received through the PSTN 6 and stored in the transmitted/received data DB 61, is attached as an attached file to the network facsimile device 2 (3).

The table management module 54 executes management such as recording or updating data of various tables (e.g., e-mail address management table, telephone operating status table, check-in management table etc.) stored in the management table 62.

The operation IF management module 53 provides the table management module 54 with instruction to update data corresponding to operations performed by a system administrator (e.g., a clerk of the hotel), when she/he operates an operation unit of the FAX relaying server 1 to execute a predetermined operation (e.g., operation corresponding to check-in, check-out, etc. which will be described in detail later).

The UDP communication module 56 is an interface for a packet communication with the network facsimile device 2 (3) in accordance with the UDP (User Datagram Protocol). In this embodiment, the UDP communication module 56 is used to affect settings of e-mail type communication among the network facsimile devices 2, 3, . . . .

The SNMP transmitting module 57 transmits the operational status in the FAX relaying server 1 to the network facsimile device 2 (3).

With the above configuration, data communication according to the UDP, data communication according to the SNMP and data communication using the e-mail messages are executed between the FAX relaying server 1 and the network facsimile device 2 (3) depending on the type and/or size of the data to be transmitted and depending on the operational status of respective devices/modules.

It should be noted that, in this embodiment, each of the FAX relaying server 1 and the network facsimile device 2 (3) has a function of the mail client and the SMTP server. When one of the FAX relaying server 1 and the network facsimile device 2 (3) functions as the mail client, the other functions as the SNTP server, thereby the data communication using the e-mail messages, which are sent from one to the other, being realized.

The data communication using the e-mail message should not be limited in the manner described above, but can be realized in another way, which is left to the user's discretion. For example, as a protocol for exchanging e-mail messages between the mail client and server, a POP (Post Office Protocol) is also known besides the SMTP. Therefore, if one of the FAX relaying server 1 or the network facsimile device 2 (3) has a POP server function and the other has a mail client function, it is possible to realize the data communication using the e-mail messages since the mail client can extract an e-mail message from a mail box of the POP server. Alternatively, an PMAP (Internet Message Access Protocol) may be used instead of the POP.

The protocol to be used one an e-mail message is transmitted from the FAX relaying server 1 to the network facsimile device 2 (3) or opposite can be arbitrarily selected. Therefore, in both direction, the SMTP or POP can be used. Alternatively, the SMTP is used in one direction, while the POP is used in the opposite direction. Therefore, it is possible to configure the network facsimile system such that only one of the FAX relaying server 1 and the network facsimile device 2 (3) has both the SMTP server function and the POP server functions, and the other of FAX relaying server 1 and the network facsimile device 2 (3) has only the mail client function.

In the above examples, the FAX relaying server 1 and the network facsimile device 2 (3) is provided with the SMTP server function or the POP server function. Alternatively, if some server computers with which the FAX relaying server and the network facsimile device 2 (3) can communicate through the LAN 4 are provided, and the SMTP server and the POP server are implemented therein, only by providing the FAX relaying server 1 and the network facsimile device 2 (3) with the mail client function, the data communication using the e-mail message can be realized through the SMTP server and the POP server.

That is, in the embodiment, only the nodded indispensable for describing the characteristics of the present system are indicated for the brevity. However, as indicated above, by constituting a well-known decenterized data processing system using a plurality of personal computers with which the FAX relaying server and the network facsimile device 2 (3) can communicate, the functions provided by the FAX slaying server and the network facsimile device 2 (3) can be provided by other server computers.

It should be noted that some functions may be implemented in the FAX relaying server 1 or other server computers connected to the LAN 4. Examples of such functions include a DHCP (Dynamic Host Configuration Protocol) server function that assigns IP address to the FAX relaying server 1 and network facsimile device 2 (3), and a name server function that converts the mail address (domain name) used in the e-mail message to a network address as well as the SMTP server function and POP server function as indicated above. Since the DHCP server function and the name server function are not the essential portion of the present invention, the following description is made on assumption that the IP address of each device is assigned by the DHCP serve (not shown) or manually assigned by the system administrator, and the name server function is provide in the LAN 4 and can be used whenever necessary.

Next, the operation of the network facsimile system according to the embodiment will be described. In the description below, it is assumed that the FAX relaying server 1 uses "FAX_SERVER@br.co.jp" as its e-mail address, the FAX relaying server 1 is capable of using a plurality of lines as connection lines to the PSTN 6, and when the PSTN 6 is used, a plurality of telephone numbers including "052-123-4567" and "052-676-5432" are used.

It is further assumed that the network facsimile device 2 uses the FAX relaying server 1 as the SMTP server for transmitting e-mail. The network facsimile device 2 stores e-mail addresses "IFAX1@br.co.jp" as its own e-mail address and "FAX_SERVER@br.co.jp" as the destination e-mail address. Among the plurality of telephone numbers the FAX relaying server 1 can use, "052-476-5432" is assigned to the network facsimile device 2, which is stored in the network facsimile device 2.

Further, it is assumed that the network facsimile device 3 uses the FAX relaying server 1 as the SMTP server 1 as the SMTP server for transmitting e-mail. The network facsimile device 3 stores e-mail addresses "IFAX2@br.co.jp" as its own e-mail address and "FAX_SERVER@br.co.jp" as the destination e-mail address. Among the plurality of telephone numbers the FAX relaying server 1 can use, "052-123-4567" is assigned to the network facsimile device 3, which is stored in the network facsimile device 3.

The e-mail addresses and the telephone numbers of the network facsimile devices 2 and 3 are assigned by the FAX relaying server 1. The FAX relaying server 1 has a e-mail address management table (see FIG. 17A), in which the telephone number, e-mail addresses, IP addresses assigned to the network facsimile devices 2 and 3, and room numbers in which the network facsimile devices 2 and 3 are located area stored in a related manner.

Hereinafter, a facsimile transmission procedure of the network facsimile system according to the embodiment will be described with being premised on the above settings.

The facsimile transmission procedure includes a network facsimile device side transmission procedure, which is executed by each network facsimile device 2 (3), and a FAX relaying server side transmission procedure, which is executed by the FAX relaying server 1.

The network facsimile device side transmission procedure will be described. FIGS. 4 through 7 show a flowchart illustrating the network facsimile device side transmission procedure executed in the network facsimile device. In the flowchart, messages displayed on the LCD 34 at respective steps are indicated.

When the network facsimile device side transmission procedure is started, the network facsimile device 2 operates in a stand-by state in which the network facsimile device 2 can acquire setting of an original (S10). At this stage, as shown on right-hand side of S10, no messages are displayed on the LCD 34 (L10). When the user of the network facsimile device 2 sets the original, the network facsimile device 2 operates to acquire input of the telephone number of the destination station (S20). As the user inputs the telephone number through the operation panel 33, the input numbers are displayed on the LCD 34 in the input order (L20).

In S30, the network facsimile device 2 waits for depression of a START button. When the user depresses the START button on the operation panel 33, the network facsimile device 2 changes the display on the LCD 34 to "Reading" (L30).

In S40, the network facsimile device 2 creates an e-mail address of the destination station. In step S40, a description to be entered in a "To field" of the e-mail header is created based on the mail address "FAX_SERVER@@br.co.jp" of the FAX relaying server 1 and the telephone number input in S20. Specifically, in this embodiment, if the telephone number of the destination station is "00312345678", the "To field" will be created as follows: "To: FAX_SERVER@br.co.jp (FAX#0312345678)".

Next, the network facsimile device 2 executes an original reading procedure (S50) in which the original set in S10 is read with the scanner 31. The image data the scanner creates by reading the original is then converted into a file having a predetermined format suitable as a file attached to an e-mail message (S60). It should be noted that the format of the attached file can be any format as far as the format is usable in the FAX relaying serve 1. In the embodiment, as an example, image data of a monochromatic image is converted into a TIFF format file, and image data of a color image is converted into a JPEG format file.

In S70, the network facsimile device 2 creates an e-mail message to be transmitted. The e-mail message created in S70 includes the "To field" created in S40 and the attached file converted in S60. An example of contents of such an e-mail message is shown in FIG. 18. It should be noted that the contents of the e-mail message and format thereof need not be limited, and various types of description/formats can be used as far as the FAX relaying server 1 can handle the e-mail message.

In S80, the network facsimile device 2 displays a message indicating that the telephone number is being dialed (i.e., "Dialing") on the LCD 34 (L40). Then, the network facsimile device 2 starts transmitting the e-mail (S90) according to the SMTP using the FAX relaying server 1 as the SMTP server. When the sail message created in S70 has been transmitted in S90, the process for transmitting the e-mail is finished (S100).

When S100 is finished, control proceeds to S110 (FIG. 5), where the network facsimile device 2 changes its operation status in a reception standby mode in which mode the facsimile device 2 is ready to receive a notification of start of a dial transmission from the FAX relaying server 1 (S110). The notification of the start of the dial transmission is one kind of status data which is transmitted in order to notify the information regarding the operational status in the FAX relaying server 1 to the network facsimile device 2. When the dial transmission start notification is received, the network facsimile device 2 can recognize whether a call is started at the first time, or the call by a redialing function is being made. It should be noted that, according to the embodiment, from the FAX relaying server 1 to the network facsimile device 2, a notification of the start of the dial transmission is sent by e-mail.

In S110, when the network facsimile device 2 has received the e-mail message, control judges whether the received e-mail message is the notification from FAX relaying server 1 (S115). Specifically, control judges whether the e-mail message received by the network facsimile device 1 is the notification from the FAX relaying server 1 based on whether the evil address of the origin station of the received e-mail message is the e-mail address of the FAX relaying server 1. If control determines that the e-mail message is the notification from the FAX relaying server 1 (S115: YES), controls judges whether the notification corresponds to the current communication (i.e., the communication from the network facsimile device 2 to the destination station outside the system) in S120. In the e-mail message the network facsimile device 2 has received contains the telephone number of the destination station which was contained in the e-mail message transmitted in S90. By judging whether the telephone number is included or not, control judges whether the e-mail message is the notification regarding the current communication.

If control determines that the e-mail message is the notification of the current communication (S120: YES), control proceeds to S130.

If the e-mail message is not the notification from the FAX relaying server 1 (S115: NO), or if the e-mail message is not the notification regarding the current communication (S120: NO), control returns to S110, thereby the network facsimile device 2 operates in the stand-by state in which the network facsimile device 2 waits for receipt of the notification of the start of the dial transmission.

In S130, control judges whether a redial is being carried out. Whether the redial is carried out or not is determined based on whether control returns to S130 after executing steps S220-S230 (which will be described later). When S130 is executed first time, control has not executed S220-S230, i.e., control determines that the current process is not a redialing process (S130: NO), and control proceeds to S150 If control has executed S220-S230 and returned to S130, it is determined that the redial is being carried out (S130: YES). In this case, the network facsimile device 2 displays the indication "Dialing" in S140 (and L40). Step S140 is similar to S80. After control has executed S220-S230 and returned to S130, the indication "Dialing" is not displayed on the LCD 34, and since S140 is executed, the indication is displayed on the LCD 34 again.

If control determines that redial is not being carried out (S130: NO) or executes S140, the operational state of the network facsimile device 2 is changed to a standby state in which the network facsimile device 2 waits for reception of FAX transmission start notification from the FAX relaying server 1 (S150). The FAX transmission start notification is, similar to the dial transmission start notification, a kind of status data included in the data related to operational status of the FAX relaying server 1, which is transmitted to the network facsimile device 2. When the FAX transmission start notification is received, the network facsimile device 2 can recognize, regarding the operational status of the FAX relaying server 1, whether transmission of the facsimile data to the destination outside the system is started, transmission error has occurred, or operates in the standby state for redialing. According to this embodiment, the FAX transmission start notification is transmitted from the FAX relaying server 1 to the network facsimile device 2 by e-mail.

If the network facsimile device 2 receives the e-mail message in S150, control judges, in S160, whether the FAX relaying server 1 has started transmitting the facsimile data to the destination station outside the system, error has occurred or the FAX relaying server operates in a stand-by state for redialing based on the received e-mail message (i.e., the FAX transmission start notification).

If control determines that the FAX relaying server 1 has started transmitting the facsimile data to the destination station outside the network facsimile system (S160: START TRANSMITTING), control proceeds to S170 and displays an indication "Sending" on the LCD 34 (L50).

Next, the network facsimile device 2 operates in a stand-by state in which the network facsimile device 2 waits for reception of a FAX transmission completion notification from the FAX relaying server 1 (S180). The FAX transmission completion notification is, similar to the aforementioned dial transmission start notification and FAX transmission start notification, a kind of status data notifying the network facsimile device 1 of data related to the operational status of the FAX relay server 1. The network facsimile device 2 that has received the FAX transmission completion notification recognizes, regarding the operational status of the FAX relaying server 1, whether the facsimile data has been transmitted to the destination station outside the system successfully or a transmission error has occurred. It should be noted that, according to the embodiment, the FAX transmission completion notification is transmitted from the FAX relaying server 1 to the network facsimile device 2 by e-mail.

FIG. 19 shows an example of the e-mail message the network facsimile device 2 receives from the FAX relaying server 1 in S180. In this example, regarding the transmission of the facsimile data form the FAX relaying server 1 to the destination station outside the system, communication results information including a communication time, a transmitted number of pages, and a communication mode is written. In practice, the contents of the e-mail message can be modified in various ways as far as the contents can be processed by the FAX relaying server 1.

If the network facsimile device 2 receives an e-mail message (i.e., FAX transmission completion notification) in S180, control judges whether the FAX relaying sever 1 has successfully transmitted the facsimile data to the destination station outside the system or a transmission error has occurred based on the received notification (i.e., e-mail message) in S190.

If control determines that the facsimile transmission has been completed successfully (S190: TRANSMITTED SUCCESSFULLY), registration of a communication management report is carried out (S200). At this stage, control turns off the display on the LCD 34 (L60). After S200 is executed, control finishes the procedure shown in FIGS. 4-6.

Figure 6:
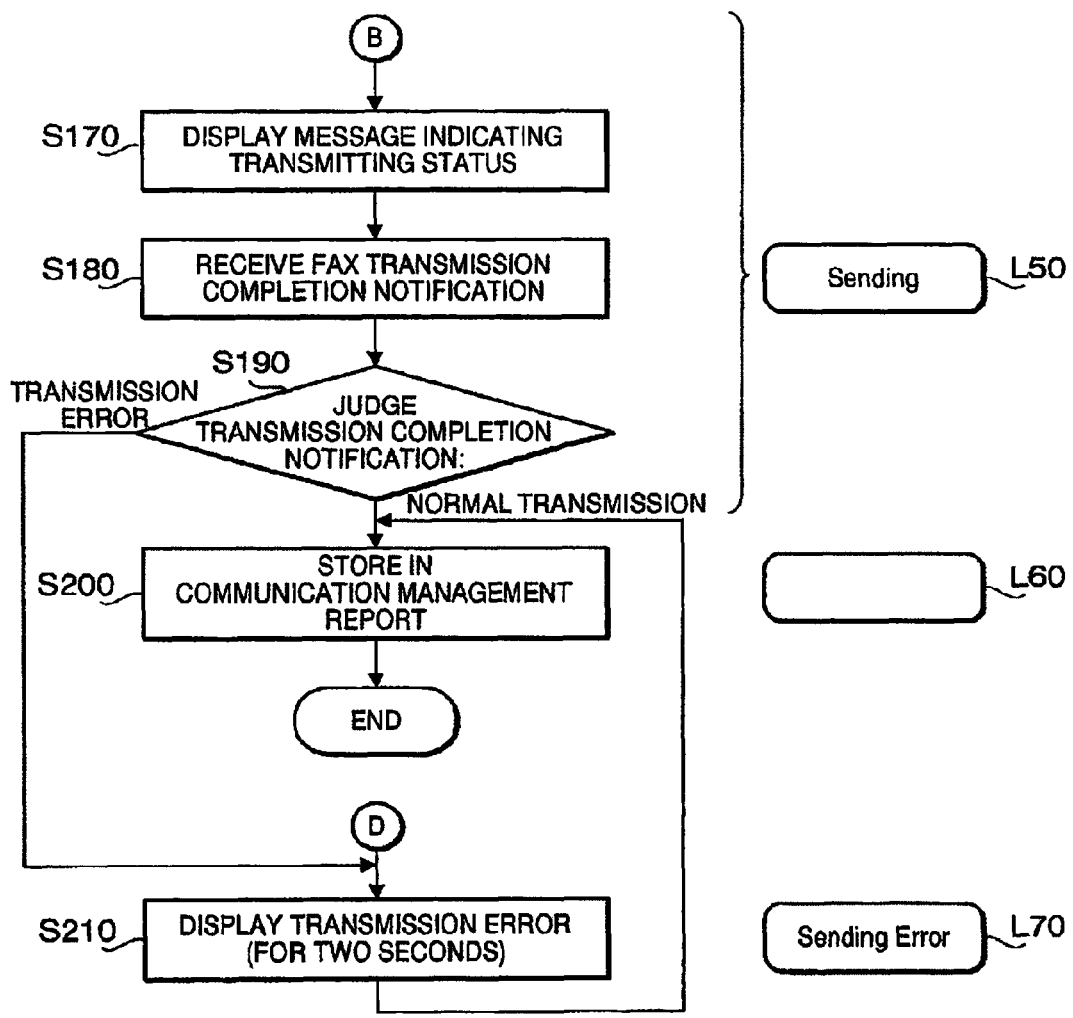
Figure 7:
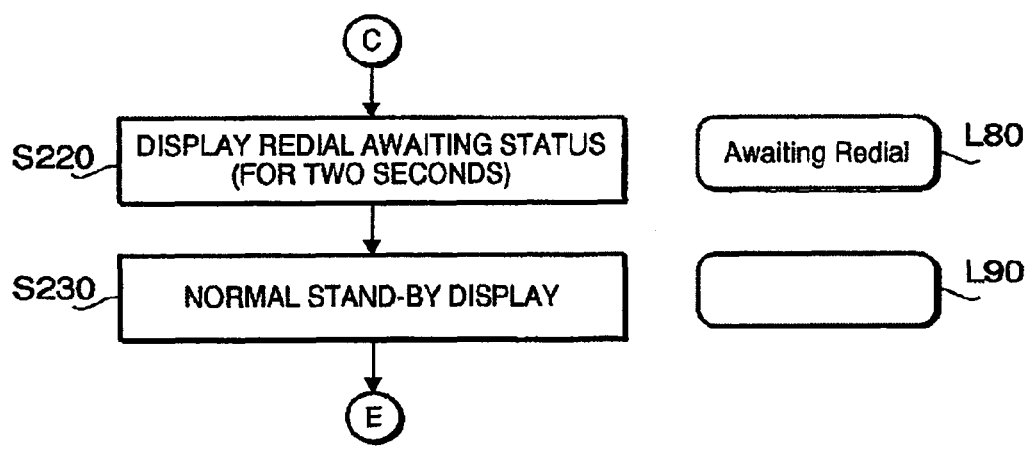

If control determines that a transmission error has occurred (S190: TRANSMISSION ERROR; or SIISSION ERROR), indication of the transmission error is made for two seconds (S210). As shown in FIG. 6, a message "Sending Error" is displayed on the ICD 34 for two seconds (L70). Thereafter, control proceeds to S200 to register the communication management report (S200) and finishes the procedure shown in FIGS. 4-6.

In the communication management report, information received by the FAX transmission completion notification and the like is stored. By executing a print/display process of the management report, a report as shown in FIG. 28, which is an example of the management report, can be printed and/or displayed. The network facsimile device 2 only exchanges e-mail messages with the FAX relaying server 1. However, as the communication report, information which can be obtained only by the FAX relaying server 1 is also registered with the communication management report. Thus, the communication management report similar to those of the normal facsimile machines which uses the PSTN 6 is registered with the network facsimile device 2.

If it is judged that the redial is carried out (S160: REDIAL), control proceeds to S220 of FIG. 7. In S170, the network facsimile device 2 displays a message indicating that process is awaiting a redialing for two seconds. Specifically, process displays a message "Awaiting Redial" on the LCD 34 for two seconds (L80). Then, the network facsimile device 2 sets the display of the LCD 34 to a normal sand-by state display (S230). According to the embodiment, at this stage, the display of the LCD 34 is turned OFF (L90). After S230 is executed, control turns to S110 and steps thereafter, which have been described above, will be repeated.

Figure 8:
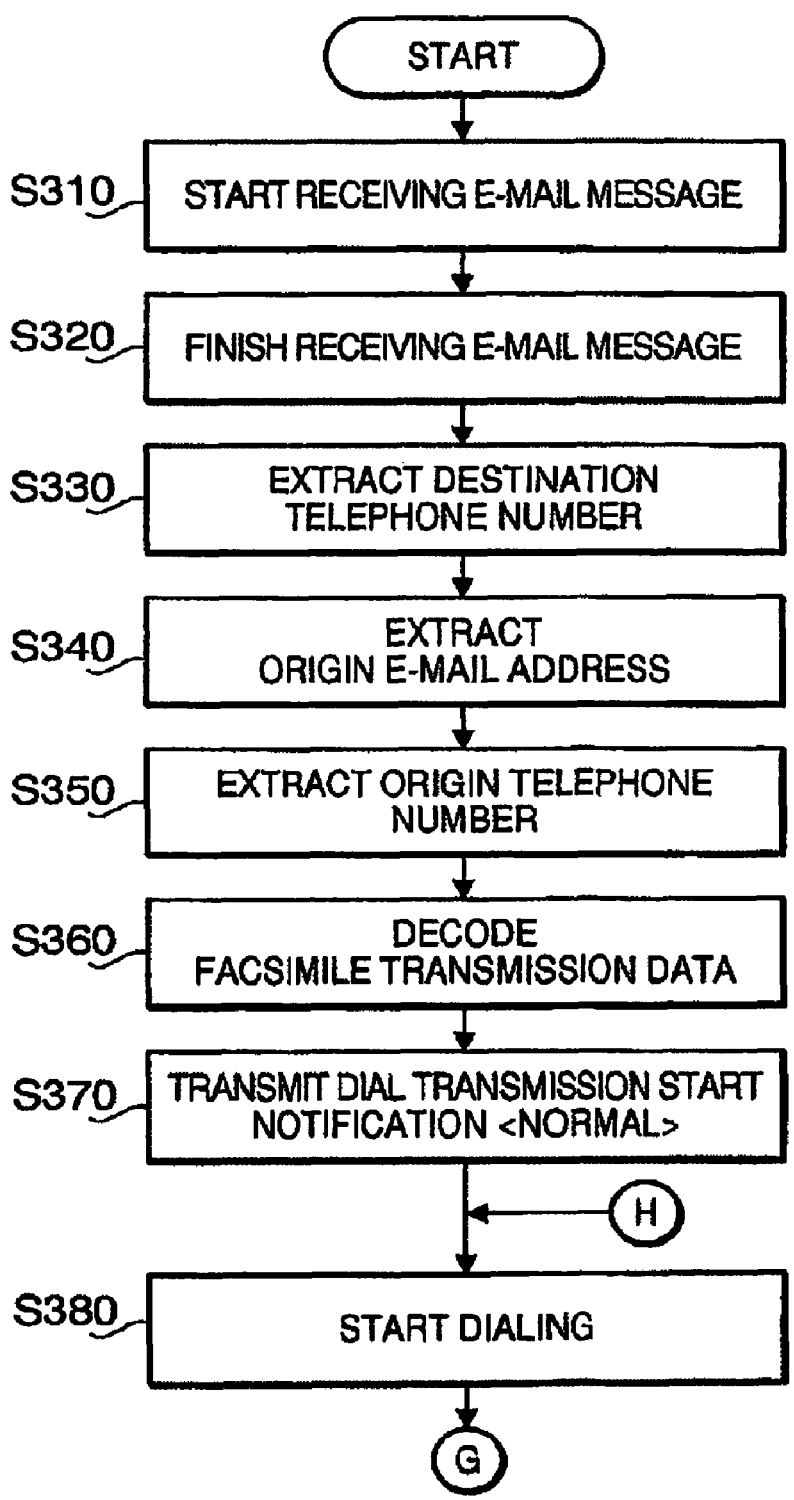
FIGS. 8 and 9 show a flowchart illustrating a facsimile relaying server side transmission procedure in accordance with aspects of the present invention.
Figure 9:
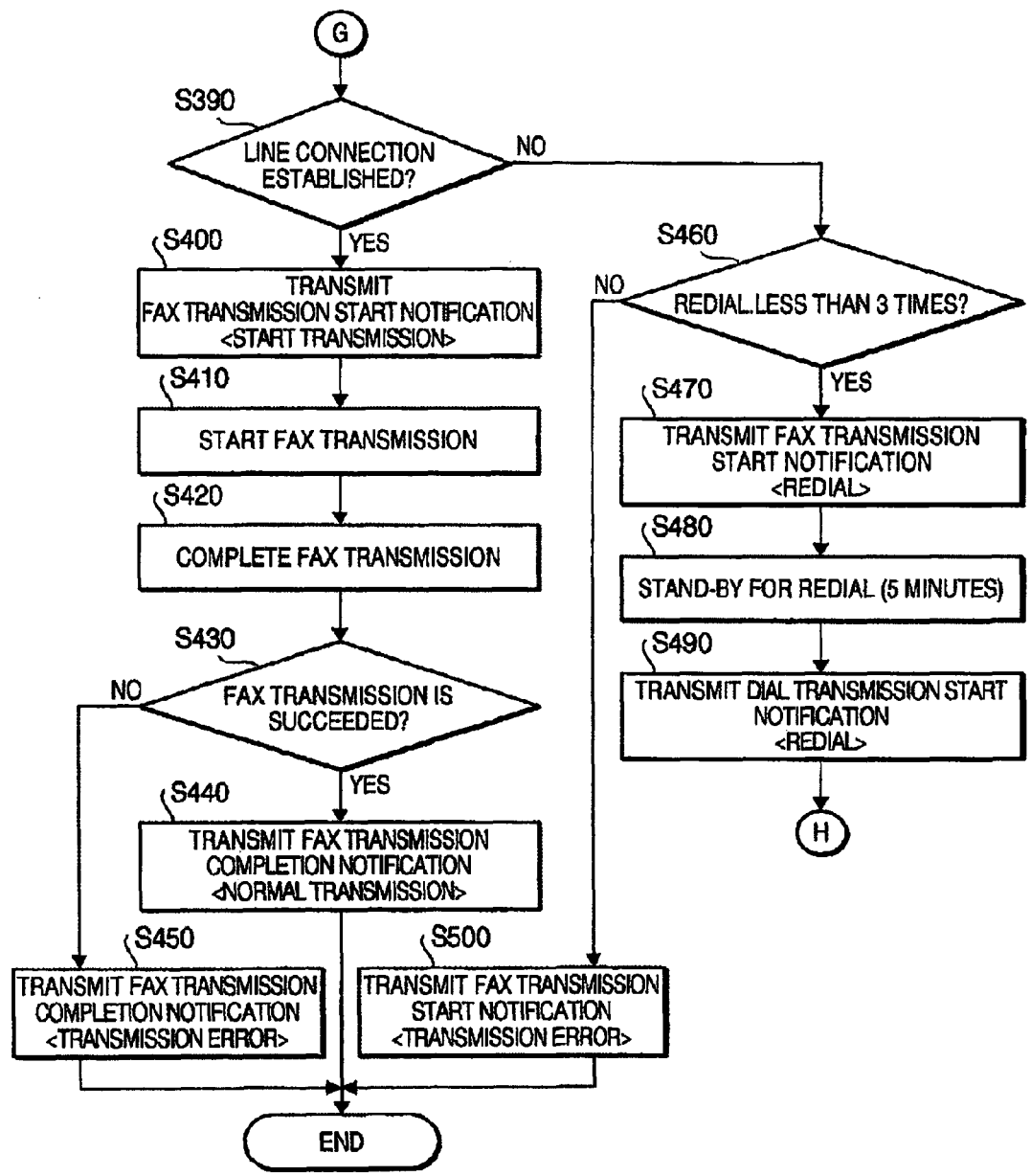

FIGS. 8 and 9 show a flowchart illustrating the FAX relaying server side transmission procedure. When the FAX relaying server transmission procedure is started, the FAX relaying server 1 functions as the SMTP server, and starts receiving an e-mail message transmitted from the network facsimile device 2 using the SMTP (S310). When the FAX relaying server 1 receives the e-mail message, it finishes the e-mail receiving process (S320). It should be noted that steps S310-S320 correspond to steps S90-S100 executed in the network facsimile device 2.

Next, the FAX relaying server 1 extracts the telephone number of the destination station from the contents of the received e-mail message (S330). The destination telephone number has been, as described above, incorporated in the "To field" of the e-mail message in S40 of FIG. 4.

The FAX relaying server 1 extracts the e-mail address of the origin station from the received e-mail message (S340). Then, using the extracted e-mail address as a key, the FAX relaying server 1 searches the e-mail address management table (see FIG. 17A) for the telephone number corresponding to the origin station e-mail address as the origin station telephone number (S350). For example, when the FAX relaying server 1 has received an e-mail address from the network facsimile device 2, the origin station e-mail address extracted in S340 is "IFAX1@br.co.jp". In S350, by searching the e-mail address management table (FIG. 17A) for the telephone number using the address "IFAX1@br.co.jp" as a key, the number "052-876-5432" is extracted as the origin station telephone number.

Next, the FAX relaying server 1 decodes the facsimile transmission data based on the file attached to the received e-mail message (S360), and transmits the dial transmission start notification <normal> (<normal> represents the content included in the notification) to the network facsimile device 2 (S370). The dial transmission start notification is, as described above, a kind of data transmitted to the network facsimile device 2 to send information related to the operational status of the FAX relaying server 1. In the embodiment, the dial transmission start notification is an e-mail message to be received in S110 by the network facsimile device 2.

When the dial transmission start notification is transmitted, the FAX relaying server 1 start dialing (S380). The FAX relaying server 1 is capable of using a plurality of lines as connection lines to the PSTN 6, and one of the lines is selected so that the origin station telephone number extracted in S350 is a telephone number of a caller, and makes a call to the destination telephone number using the line selected in S330.

Control proceeds to S390, where the FAX relay server 1 judges whether the line has been connected (S390). If it is determined that the line is connected with the destination outside the system (S390: YES), the FAX relaying server 1 transmits the FAX transmission start notification <start of transmission> to the network facsimile device 2 (S400). The FAX transmission start notification is, as described above, a kind of data for transmitting information related to the operation status of the FAX relaying server 1, and is an e-mail message received by the network facsimile device 2 in S150.

Next, the FAX relaying server 1 starts the facsimile transmission to the destination station outside the system (S410). After the FAX relaying server has finished the transmission in accordance with the facsimile communication protocol, it finishes the facsimile transmission (S420). Then, the FAX relaying server judges whether the facsimile transmission has completed successfully (S430).

If the facsimile transmission has been completed successfully (S430: YES), the FAX transmission completion notification <normal transmission> is transmitted to the network facsimile device (S440), and the procedure shown in FIGS. 8 and 9 is finished. If the facsimile transmission has not been completed successfully (S430: NO), the FAX relaying server 1 transmits the FAX transmission completion notification <transmission error> to the network facsimile device 2 (S450) and finishes the procedure. The FAX transmission completion notifications described above are, as aforementioned, kinds of data related to information on operational status of the FAX relaying server 1 and is transmitted to the network facsimile device 2. The notification is received by the network facsimile device 2 in S180 of FIG. 6.

If control determines that the connection with the destination station outside the system has not been completed (S390: NO), control judges whether the number of redials is less than three or not (S460).

If the number of redials is less than three (S460: YES), the FAX relaying server 1 transmits the FAX transmission star notification <redial> to the network facsimile device 2 (S470). Then, the FAX relaying server 1 operates in a redial stand-by mode (S480) and stay in this mode for five minutes. When five minutes have elapsed, the FAX relaying server 1 transmits the dial transmission start notification <redial> to the network facsimile device 2 (S490). After S490 has been executed, control returns to S380 to start dialing.

If, in S460, the number of redials is not less than three (S460: NO), the FAX relays server 1 transmits the FAX transmission completion notification <transmission error> (S500) to the network facsimile device 2 and finishes the procedure shown in FIGS. 8 and 9.

As described above, the network facsimile side transmission procedure and FAX relaying server side transmission procedure are executed in parallel, thereby the facsimile transmission procedure of the network facsimile system is realized and facsimile images can be transmitted form the network facsimile device 2 to the destination station outside the network facsimile system via the FAX relaying server 1.

Next, a facsimile reception procedure of the network facsimile system according to the embodiment will be described. The facsimile reception procedure of the network facsimile system includes a network facsimile device side reception procedure executed in the network facsimile device 2 and a FAX relaying server side reception procedure executed in the FAX relaying server 1.

Figure 10:
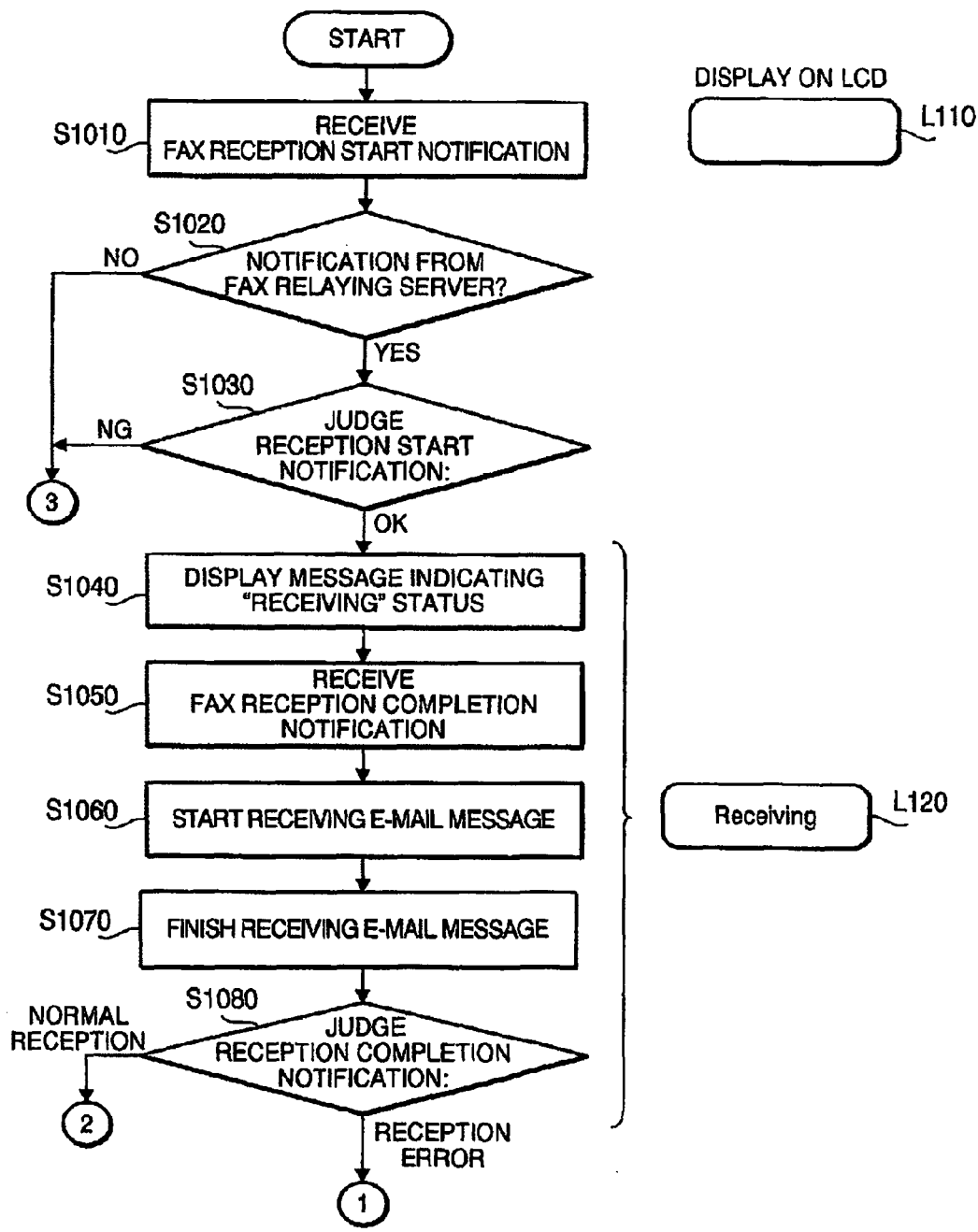
FIGS. 10 and 11 show a flowchart illustrating a network facsimile side reception procedure in accordance with aspects of the present invention.
Figure 11:
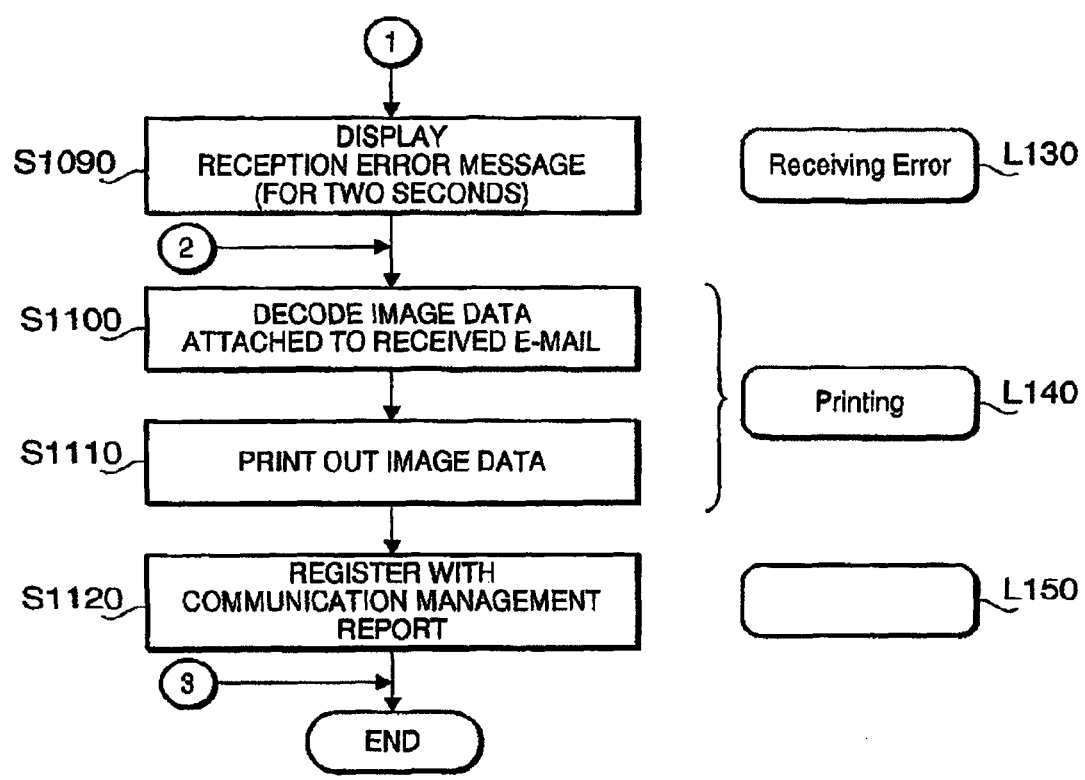

FIGS. 10 and 11 show a flowchart illustrating the network facsimile device side reception procedure. Beside some steps, exemplary indications on the LCD 34 are illustrated.

When the network facsimile device side reception procedure is started, the network facsimile device 2 is, as shown in FIG. 10, operates in a state in which it acquires a FAX reception start notification transmitted from the FAX relaying server 1 (S1010). The FAX reception start notification is a kind of data which is transmitted to the network facsimile device 2 to send the operational status of the FAX relaying server 1. When the FAX reception start notification is received, the network facsimile device 2 recognzies that the FAX relaying server 1 starts receiving the facsimile data transmitted form the origin station outside the network facsimile system. It should be noted that, according to the embodiment, the FAX reception start notification is transmitted from the FAX relaying server 1 to the network facsimile device 2 by e-mail. When step S1010 is started, no information is displayed on the LCD 34 (L110).

In S1010, if the network facsimile device 2 has received the e-mail message, control judges whether the received e-mail message is the notification received from the FAX relaying server 1 (S1020). Specifically, control judges whether the e-mail message as received has been transmitted from the FAX relaying server by examining whether the origin address of the e-mail message the network facsimile device 2 has received is the e-mail address of the FAX relaying server 1. Further, as a result of the decision in S1020, if control determines that the received e-mail message has been transmitted from the FAX relaying server 1 (S1020: YES), control judges whether it is an appropriate reception start notification (S1030). Specifically, control judges whether the destination e-mail address indicated in the e-mail message received by the network facsimile device is the e-mail address assigned to the network facsimile device 2, and whether the destination telephone number is equal to the telephone number assigned to the network facsimile device 2.

If the control determines that the received e-mail message is an appropriate notification indicating the start of reception (S1030: OK), control proceeds to S1040. If, in S1020, control determines that the received e-mail message is not the notification from the FAX relaying server 1 (S1020: NO) or the received notification is not the appropriate one (S1030, NG), control finishes the procedure shown in FIGS. 9 through 11.

In S1040, the network facsimile device 2 displays a message on the LCD 34 to indicate that it receives data. That is, on the LCD 34, a message "Receiving" is displayed (L120). Then, control changes the operational status of the network facsimile device 2 to a reception stand-by status in which the network facsimile device 2 waits for receiving the FAX reception completion notification from the FAX relaying server 1 (S1050). The FAX reception completion notification is a kind of data transmitted to the network facsimile device 2 to transmit information related to the operational status of the FAX relaying server 2. The network facsimile device 2, which has received the FAX reception completion notification, recognizes whether the FAX relaying server 1 has received the facsimile data successfully or an error has occurred. It should be noted that, according to this embodiment, the FAX reception completion notification is transmitted from the FAX relaying server 1 to the network facsimile device 2 by e-mail.

Next, the network facsimile device 2 functions as the SMTP server and starts receiving the e-mail message transmitted form the FAX relaying server 1 (S1060). When the network facsimile device 2 has received the e-mail message, it finishes receiving the e-mail message (S1070).

Then, the network facsimile device 2 judges, in S1080, whether the FAX relaying server 1 has received the facsimile data from the origin station outside the network facsimile system or an error has occurred based on the FAX reception completion notification received in S1050.

When it is recognized that an error has occurred (S1080: RECEPTION ERROR), control proceeds to S1090, where the network facsimile device 2 displays an error message for two seconds (S1090). Specifically, in S1090, a message "Receiving Error" is displayed on the LCD 34 for two seconds (L130).

If it is confirmed that the data has been received successfully (S1080: NORMAL RECEPTION), or S1090 of FIG. 11 is finished, control proceeds to S1100, where the network facsimile device 2 decodes the image data attached to the received e-mail message (S1100), and prints out the decoded image data (S1110). At this stage, control changes the message displayed on the LCD 34 to a message "Printing" (L140).

In S1120, regarding the received facsimile data, a communication management report is registered. At this stage, the network facsimile device 2 turns off the message on the LCD 34 (L150). When S1120 is executed, control finishes the procedure.

Figure 12:
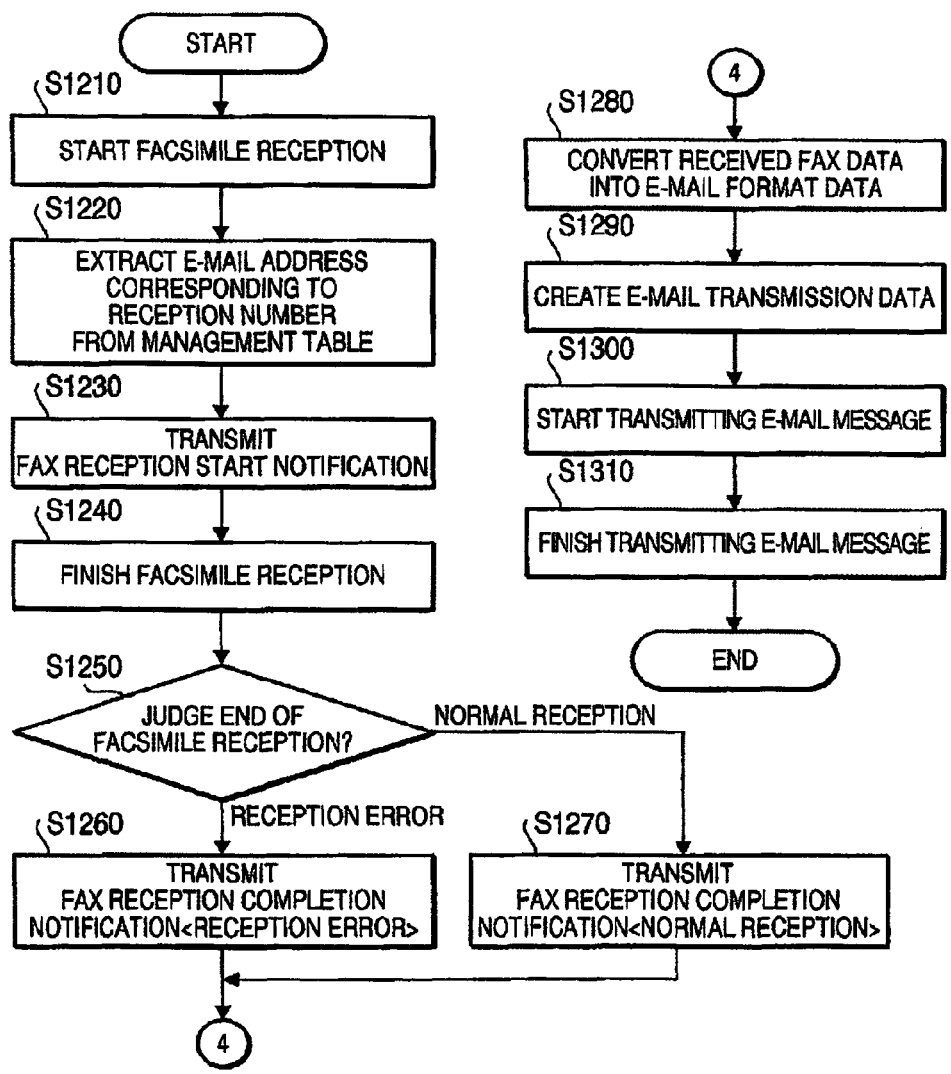
FIG. 12 shows a facsimile relaying side reception procedure in accordance with aspects of the present invention.

Next, FAX relaying server side reception procedure will be described. FIG. 12 shows a flowchart illustrating the FAX relaying side reception procedure. When the FAX relaying server side reception procedure is started, the FAX relaying server 1 starts receiving the facsimile data transmitted from the origin station outside the network facsimile system (S1210).

In parallel with the reception of the facsimile data, the FAX relaying server 1 extracts the e-mail address corresponding to a reception telephone number, through which the facsimile data is received, form the management table (S1220). The FAX relaying server 1 is capable of using a plurality of lines as connection lines to the PSTN 6, and a plurality of telephone numbers are assigned to the lines, respectively. When the facsimile data is received, one of the plurality of telephone numbers is designated by the origin station outside the network facsimile system, and the designated number is referred to as the reception telephone number.

In S1220, using the reception telephone number as a key, control searches the e-mail address management table (FIG. 17A) and extracts the e-mail address which is related to the reception telephone number. For examples if the reception telephone number is "052-876-5432", control searches the e-mail address management table (FIG. 17A) to find an e-mail address which is stored therein in relation to the telephone number same as the reception telephone number. In the above example, the e-mail address "IFAX1@br.o.jp" is extracted.

Than, the FAX relaying server 1 transmits the FAX reception start notification to the network facsimile device 2 (S1230). The FAX reception start notification is, as aforementioned, a kind of status data transmitted to the network facsimile device 2 to transmit information related to the operation status of the FAX relaying server 1. Specifically, the notification is an e-mail message which is received by the network facsimile device 2 in S1010.

While steps S1220-S1230 are executed, the facsimile data is kept received. After the facsimile data has been received, the FAX relaying server 1 finishes the facsimile reception procedure (S1240). When received the facsimile data, the FAX relaying server 1 judges whether the facsimile data has been received successfully (S1250). If an error has occurred (S1250: REVLON ERROR), the FAX relaying server 1 transmits the FAX reception completion notification <RECEPTION ERROR> to the network facsimile device 2 (S1260). If the facsimile data has been successfully received (S1250: NORMAL RECEPTION), the FAX relaying server 1 transmits the FAX reception completion notification <NORMAL RECEPTION> to the network facsimile device 2 (S1270). The FAX reception completion notification is, as aforementioned, a kind of status data transmitted to the network facsimile device 2 to transmit information related to the operation status of the FAX relaying server 1. Specifically, the notification is an e-mail message which is received by the network facsimile device 2 in S1050.

When S1260 or S1270 is executed, the FAX relaying server 1 converts the received facsimile data in e-mail format data (S1280). That is, regardless whether the end status of the received facsimile data examined in S1250 is successful or not (error), the received facsimile data is converted in e-mail format data. With this conversion, if facsimile data has been normally received in the beginning and error has occurs in a midway of its reception, the normally received portion of the received facsimile data can be converted into e-mail format data.

The FAX relaying server 1 creates e-mail transmission data (S1290). The data created in S1290 is an e-mail message having the e-mail address that is extracted in S1220, and includes the facsimile data created in S1280 as its attached data It should be noted that concrete contents and format of the e-mail data can be arbitrarily determined as far as it can be processed by the network facsimile device 2.

Next, the FAX relaying server 1 uses the network facsimile device 2 as the SMTP server and starts transmitting the e-mail message (S1300). After transmitting the e-mail message created in S1290, control finishes the evil transmitting process (S1310). Steps 1300-1310 correspond to steps S1060-S1070 executed in the network facsimile device 2. When S1310 has been executed, control finishes this procedure.

The network facsimile side reception procedure and the FAX relaying server side reception procedure are executed in parallel, and as a result, the facsimile reception procedure by the network facsimile system is realized and the facsimile image transmitted from the origin station outside the network facsimile system to the network facsimile device 2 via the FAX relaying server 1 can be received.

It should be noted that, in the above-described facsimile transmission procedure/facsimile reception procedure by the network facsimile system according to the embodiment, the notifications transmitted/received between the FAX relaying server 1 and the network facsimile device 2 are realized by e-mail messages. The method need not be limited to such a configuration, and, if the similar information can be transmitted/received, notifications may be realized with another packet communication protocol.

In the description above, as an example of an e-mail message that is received in S180, the e-mail message of FIG. 19 is shown. This can be modified such that the contents of the e-mail message shown in FIG. 19, i.e., the communication result information including the communication time, the number of pages of transmission, the communication mode may be obtained using the SNMP, If the SNMP is used, object IDs (OIDs) as indicated in FIG. 20 may be assigned to the respective pieces of result information and stored in an MIB (Management Information Base), and by designating the OID using the SNMP to request for the designated information so that respective pieces of information can be obtained.

In the description above, when the facsimile transmission procedure/facsimile reception procedure of the network facsimile system are executed, both the FAX relaying server 1 and the network facsimile device 2 recognize the e-mail addresses and formation related to the telephone numbers to be used each other. Strictly speaking, such information is dynamically exchanged between the FAX relaying server 1 and the network facsimile device 2, and as a result, both the FAX relaying server 1 and the network facsimile device 2 recognize consistent information.

Specifically, information regarding the e-mail addresses and telephone numbers to be used by the FAX relaying server 1 and the network facsimile device 2 is managed by the FAX relaying server 1, and is notified to the network facsimile device 2. When such information is notified by the FAX relaying server 1 to the network facsimile device 2, an IP address of the network facsimile device 2 is necessary when the FAX relaying device 1 communicates therewith through the LAN 4. Further, as will be described later, the number of the room in which the network facsimile device 2 is located will also be necessary. Such information regarding individual network facsimile devices is dynamically obtained or managed by the network facsimile devices and notified from the network facsimile devices to the FAX relaying server 1.

Figure 13:
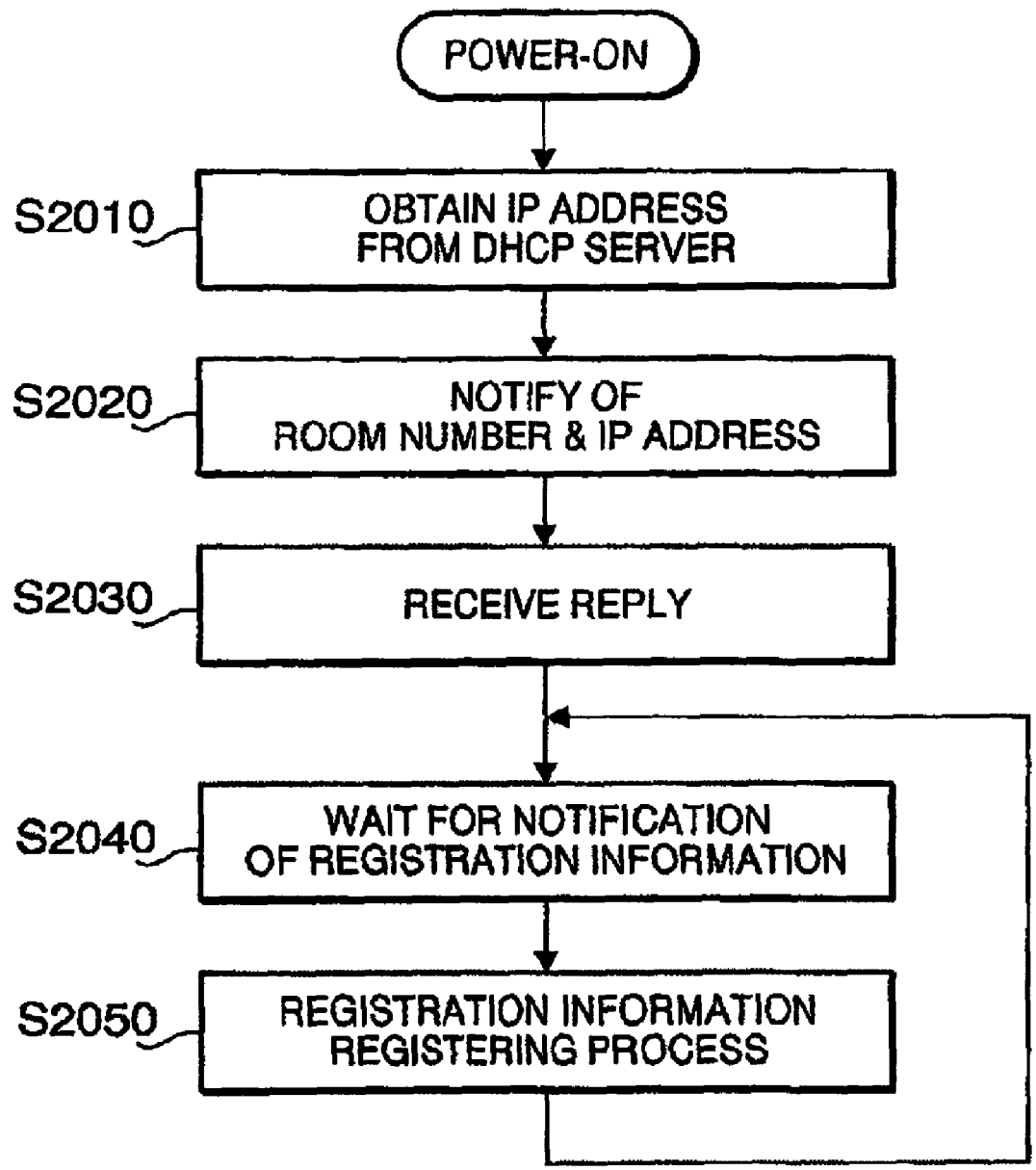
FIG. 13 shows a flowchart illustrating a registered information transmitting procedure executed in the network facsimile device in accordance with aspects of the present invention.

Hereinafter, a registered information transmitting procedure for exchanging information as above will be described. FIG. 13 shows a flowchart illustrating the registered information transmitting procure executed in the network facsimile device 2.

When the network facsimile device 2 is started up, the network facsimile device 2 obtains an IP address from a DHCP server (S2010). Since the DHCP server is well-known, it is omitted in FIG. 1. It should be noted that the FAX relaying server 1 may have a function of the DHCP server. Alternatively, another server computer connected to the LAN 4 may have the DHCP function. The DHCP server assigns an IP address that is not used by another node to the network facsimile device 1. However, if the DHCP server is configured to maintain a relationship between a node and the IP address assigned to the node for a certain period of time (e.g., one or two days), even thought the network facsimile device 2 is rebooted one or more times within the period, the same IP address can be assigned to the network facsimile device 2. The IP addresses of the network facsimile devices 2 and 3 may be assigned and fired manually by the system administrator. In view of a burden to the system administrator, however, it is preferable that the IP addresses may be automatically assigned. Instead of the DHCP server, BOOTP (BOOTstrap Protocol), or APIPA (Automatic Private IP Addressing) may be used.

When obtaining the IP address, the network facsimile device 2 notifies the FAX relaying server 1 of the room number and the thus obtained IP address (S2020). At this point of time, the network facsimile device 2 has not recognized the e-mail address etc. of the FAX relaying server 1. Therefore, in S2020, the facsimile device 2 notifies by a UDP broadcast. Specifically, it is determined that the FAX relaying server 1 and the network facsimile device 2 perform the USP broadcast using a predetermined communication ports ("58***"; where each "*" represents a numeral) in advance, and as shown in FIG. 21. The network facsimile device 2 transmits packets to the FAX relaying server 1 using the UDP broadcast. The packets as transmitted may include a version number of software of the network facsimile device 2, the room number and the IP address. In the example shown in FIG. 21, using a symbol "|" as a delimiter, a character string indicating the version number "A", the room number "1101" and the IP address "92.168.19.11" is indicated.

Next, the network facsimile device 2 operates in a stand-by state so that it can acquire response to the UDP broadcast (S2030). If the response from the FAX relaying server 1 is received, the network facsimile device 2 operates in another stand-by state to acquire notification of the registered information (S2040). The registered information is the information regarding the e-mail address and telephone number assigned to the network facsimile device 2 transmitted from the FAX relaying server 1. It should be noted that, in this embodiment, the e-mail address and the telephone number are dynamically assigned, i.e., they are assigned in response to check-in/check-out with respect to the room where the network facsimile device 2 is located. Therefore, if the room is in the checkout state, the FAX relaying server 1 notifies the network facsimile device 2 of null data as the registered information. When S2040 is executed, the e-mail address has not been assigned to the network facsimile device 2. Therefore, the notification in S2040 is performed using the SNMP.

When the registered information is received, the network facsimile device 2 executes registration of the received registered information (S2050). In this procedure, the network facsimile device 2 registers the received information with the memory so that it can be used in the following process. Further, the network facsimile device 2 executes various settings for transmitting/receiving e-mail messages, using the notified e-mail address. After the process in S2050, control returns to S2040. Thereafter, upon receipt of the registered information from the FAX relaying server 1, control executes S2050, thereby the information registered in the memory being updated and the latest information being kept therein.

Figure 14:
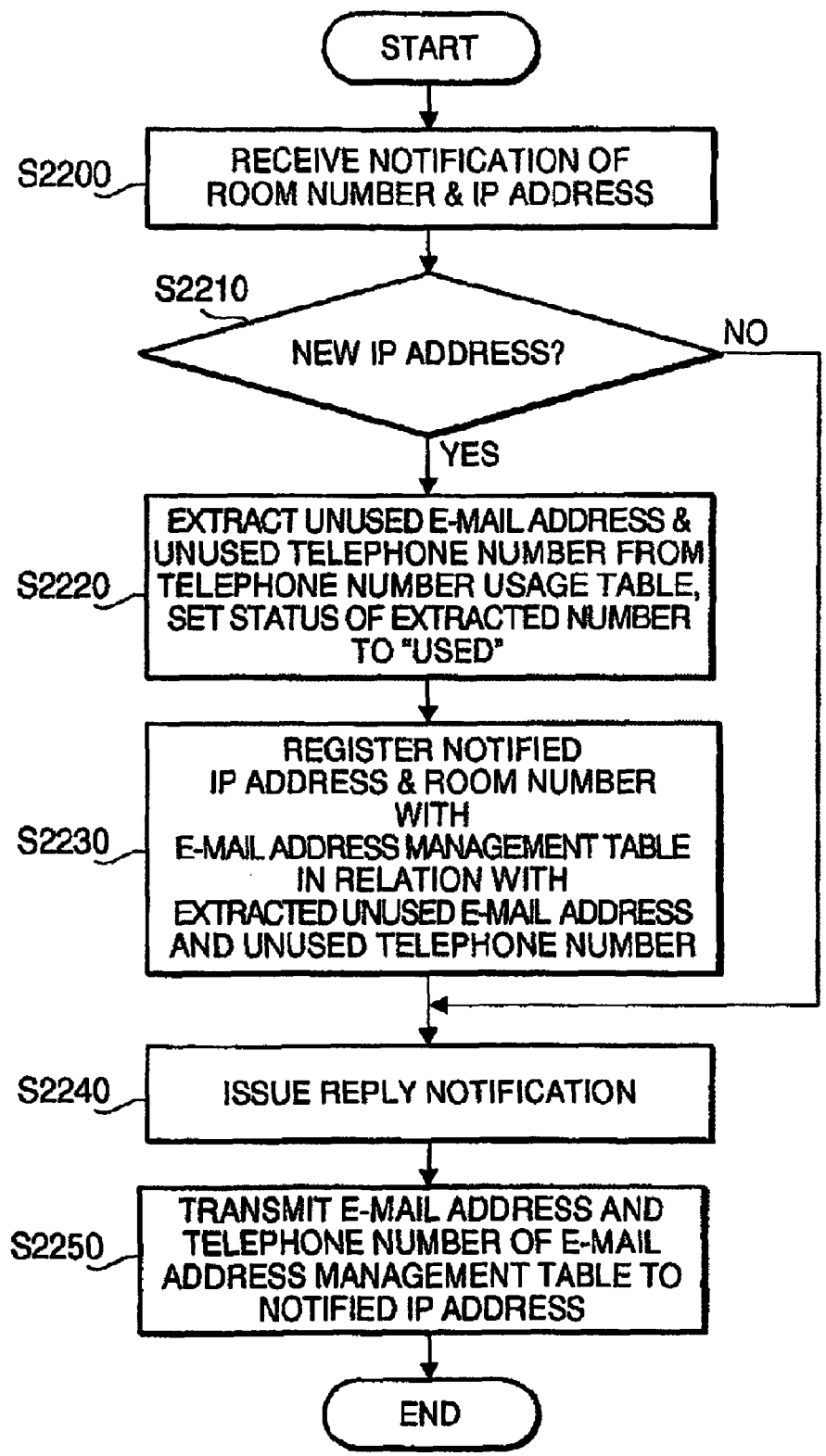
FIG. 14 shows a flowchart illustrating a registered information transmitting procedure executed in the facsimile relaying server in accordance with aspects of the present invention.

FIG. 14 shows a flowchart illustrating the registered information transmitting procedure executed in the FAX relaying server 1. When the procedure shown in FIG. 14 starts, the FAX relaying server 1 receives a notification of the room number and IP address from the network facsimile device 2 (S2200). This notification is transmitted as the network facsimile device executes step S2020.

Next, the FAX relaying server 1 judges whether the IP address included in the received notification is a newly assigned IP address (S2210). Specifically, in S2210, control search the e-mail address management table (FIG. 17A) using the IP address included in the received notification as a key. If the IP address included in the received notification is not found, control determines that the received IP address is a new IP address. If the same IP address as received is included in the e-mail address management table, control determines that the IP address as received is not a new IP address.

If the received IP address is a new IP address (S2210: YES), the FAX relaying server 1 extracts unused e-mail address and unused telephone number from a telephone number usage table (FIG. 17B), and sets the status of the extracted e-mail address and telephone number to "busy" (S2220). As shown in FIG. 17B, the telephone number usage table includes a plurality of pairs of e-mail address and telephone number, and a plurality of status flags are provided for respective pairs. In S2220, the unused e-mail address and telephone number whose status flag is "unused" are selected, and the flag is rewritten to "busy".

Next, the FAX relaying server 1 newly registers the IP address and room number notified in S2200 along with the unused e-mail address and unused telephone number extracted in S2220 in a related manner (S2230).

When step S2230 has been executed as above or the notified IP address is not a new IP address (S2210: NO), the FAX relaying server 1 issues a response notification (S2240). The response notification will be received by the network facsimile device 2 in S2030. The FAX relaying server 1 transmits, in S2250, the newly registered e-mail address and telephone number in S2230 to the IP address notified in S2200, and finishes the procedure. This notification will be received by the network facsimile device 2 in S2040, and as described above, the notification is made using the SNMP.

The registered information transmitting procedures executed by the FAX relaying server 1 and the network facsimile device 2 have been described. In addition to the above procedures, in the FAX relaying server 1, in accordance with the check-in and check-out with respect to each hotel room, an updating procedure for updating the e-mail address management table, telephone usage table and check-in management table is executed.

Figure 15:
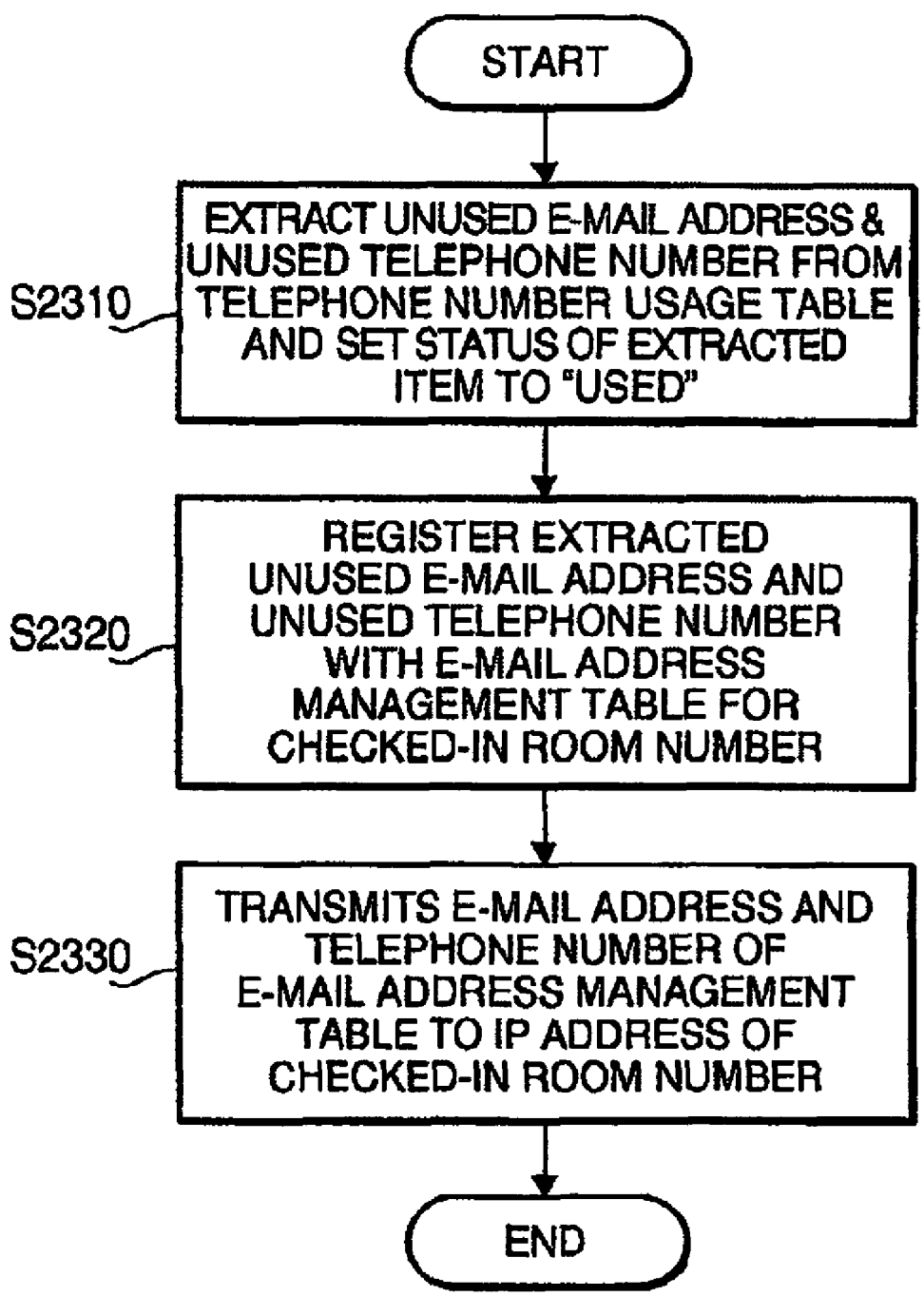
FIG. 15 shows a flowchart showing an updating procedure at a time of check-in of a user in accordance with aspects of the present invention.

FIG. 15 shows a flowchart showing a check-in updating procedure at a time of check-in with respect to a hotel room. When a clerk of the hotel performs an operation, on the FAX relaying server side, to register the check-in with respect to a hotel room in response to the check-in of a user, and the status flag of the check-in management table (FIG. 17C) is updated to indicate "check-in", the check-in updating procedure is executed for the room of which the status flag has been updated.

When the check-in updating procedure is started, the FAX relaying server 1 extracts an unused e-mail address and unused telephone number from the telephone number status table (FIG. 17B), and set the status flag of the extracted e-mail address and telephone number to "busy" (S2310). This process is similar to step S2220. That is, in the telephone number status table, a pair of e-mail address and telephone number corresponding to a status flag of "unused" are extracted, and the status flag is rewritten to "busy".

Next, the FAX relaying server 1 registers the unused e-mail address and unused telephone number extracted in S2310 with the e-mail address management table 17A of the room which is checked in (S2320). The number of the room which is checked-in is the number corresponding to the status flag of the check-in management table (FIG. 17C) having been changed to "check-in". Using the room number as a keys control searches the e-mail address management table (FIG. 17A) to detect the e-mail address, and in the areas of telephone number and e-mail address of the e-mail address management table corresponding to the detected room number, the unused e-mail address and telephone number are stored.

The FAX relaying server 1 transmits a notification including the e-mail address and telephone number registered with the e-mail address management table (FIG. 17A) in S2320 to the IP address corresponding to the "checked-in" room number of the e-mail address management table (S2330), and finishes the procedure. This notification will be received by the network facsimile device 2 in S2040, and as aforementioned, the SNMP is used.

With the above check-in updating procedure, in response to a check-in of a user, the FAX relaying server 1 dynamically assigns an e-mail address and a telephone number to the network facsimile device 2 located in the room subject to be checked-in.

Figure 16:
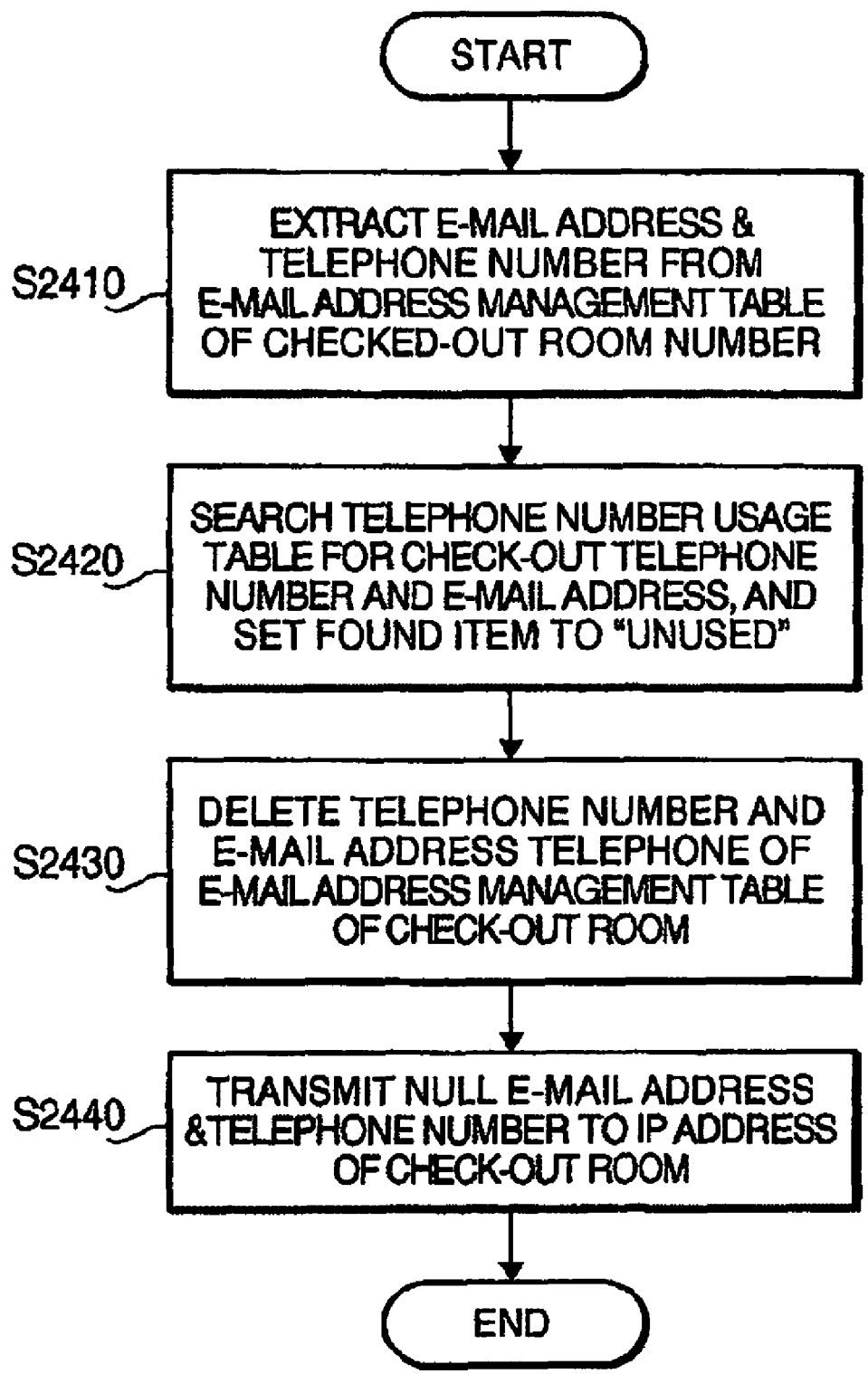
FIG. 16 shows a flowchart showing an updating procedure at a time of check-out of the user in accordance with aspects of the present invention.

FIG. 16 shows a flowchart showing a check-out updating procedure at a time of check-out. When a clerk of the hotel performs an operation, on the FAX relaying sever side, to register the check-out with respect to a hotel room in response to the check-out of a user, and the status flag of the check-in management table (FIG. 17C) is updated to indicate "check-out", the check-out updating procedure is executed for the room of which the status flag has been updated.

When the checkout updating procedure is started, the FAX relaying server 1 extracts the e-mail address and telephone number from the e-mail address management table (FIG. 17B) for the room subjected to the check-out (S2410). The room number of the checked out is a room number corresponding to the flag "check-out" in the check-in management table (FIG. 17C). Using the room number as a key, control searches the e-mail address management table (FIG. 17A), and when the room number is detected, from the corresponding areas, the e-mail address and telephone number having been assigned thereto are extracted.

Next the FAX relaying server 1 detects the e-mail address and telephone number corresponding to the check-out room in the telephone number usage table (FIG. 17B) and set the status information thereof to "unused" (S2420). That is, the telephone number usage table stores pairs of telephone number and e-mail address. When the pair of the check-out telephone number and e-mail address are detected, the states flag corresponding to the pair it rewritten to "unused".

Then the FAX relaying server 1 deletes the e-mail address and telephone number of the e-mail address management table (FIG. 17B) corresponding to the room subject to the check-out (S2430). Since the e-mail address and telephone number to be deleted in the e-mail address management table have been detected in S2410, control simply deletes the e-mail address and telephone number as detected. As a result, in the e-mail address management table, only the IP address and room number remain and the areas for the e-mail address and telephone number corresponding to the room subject to check-out, null data is stored. It should be noted that, instead of deleting the e-mail address and telephone number from the e-mail address management table, status flags for the e-mail address and telephone number are employed and setting the flags to "invalid", the process similar to S2430 can be realized.

Next, the FAX relaying server 1 transmits a notification indicating null e-mail address and telephone number to the IP address of the room subject to check-out (S2440), and finishes the procedure. The notification will be received in S2040 by the network facsimile device 2, and as aforementioned transmitted using the SNMP.

With the above-described check-out updating procedure, the e-mail address and telephone number assigned to the network facsimile device 2 located in the room subject to the check out can by dynamically deleted in response to the check-out by the user.

As described above, the communication setting between the FAX relaying server 1 and the network facsimile device 2 (3) is made in association with the check-in procedure of the user of the room in which the network facsimile device is located. Therefore, when the check-in procedure has not been finished, the FAX relaying server 1 may not have assigned the e-mail address and telephone number to the network facsimile device 2 (3). In such a case, the network facsimile devices may not store the e-mail address and telephone number to be used, of may store invalid information. It could rarely happen that the e-mail address and telephone number stored therein may be deleted due to disorder of the network facsimile device 2. It is preferable that, in such a case, the network facsimile device 2 (3) does not acquire the facsimile transmission from another communication terminal.

In order to cope with the above problem, the following procedure may be implemented. Control judges whether the communication settings are made appropriately in the network facsimile side transmission procedure at an early stage, e.g., when the destination telephone number is acquired in S20 or the depression of the start button is detected in S30. Then, if the appropriate communication settings have not been made, control may display an error message or outputs an alarm sound so that the user of the communication terminal can recognize immediately. It would be convenient if a message indicating the user how to deal with the problem, for example, a message indicting the user to contact the system administrator (e.g., the clerk of the hotel).

There would occur some error condition on the FAX relaying server side. For example, the sender's e-mail address of the e-mail message received from the network facsimile device 2 (3) is not valid in the e-mail address management table, the check-in management table corresponding to the room number is not set to "check-in", or in the telephone number usage table, the telephone number corresponding to the e-mail address may not be set to "busy". When some error as above is detected, a system error has occurred or an e-mail message has been transmitted from a device other than the regular network facsimile device 2 (3). It is also preferable, in such a case, that the facsimile transmission will not be acquired (or forcibly terminated) when an error is detected, for example, in S310, S340 or S350. It would further be convenient if a message indicating the user to contact the system administrator (e.g., the clerk of the hotel).

The foregoing is a case where the facsimile transmission is made from the network facsimile system according to the embodiment. When a facsimile message is received, since the origin station outside the network facsimile system can designate any possible telephone number. Therefore, the telephone number used for transmitting facsimile data, which is received by the FAX relaying server 1, may be the number which has not been set to be used for receiving the facsimile transmission.

For example, according to the embodiment, the settings for communication between the FAX relaying server 1 and network facsimile device 2 (3) are released in association with the check-out procedure of the user of the rooms in which the facsimile devices 2 and 3 are implemented. When a call as above is received, if the communication settings are released, problems as follow could occur: (1) an e-mail address corresponding to the telephone number of the line received the call is not appropriately stored in the e-mail address management table (i.e., the memory is cleared, or a flag indicates that the memorized number is invalid; (2) the room corresponding to the line through which the call is received is not set to "check-in" status in the check-in management table.

The above erroneous condition may occur when the telephone number designated by the origin station is the number used by a user before he/she checked out the hotel room. Therefore, if such a condition occurs when S3210 is executed, it is preferable to reject the call. If the condition occurs after S3210, it is preferable to disconnect the line immediately when the problem in the designated telephone number is detected, or not to receive the facsimile transmission.

As described above, according to the network facsimile device 2 configured as above, it is possible to notify that, during the entire period from the start of transmission by the network facsimile device 2 to the completion of the transmission by the FAX relaying server 1, the progression of the operation by the network facsimile system.

In particular, since the network facsimile device 2 receives the status data from the FAX relaying server 1 and notify the operational status of the network facsimile system, it is possible to notify the user of the communication terminals of the progression of the operation in detail.

Further, according to the network facsimile system, the origin station outside the system can transmit the facsimile image to a desired network facsimile device among the various devices of the network facsimile system only by inputting the telephone number, similarly to the normal facsimile machine. Therefore, for the user of the origin station outside the system, no preparation for the network facsimile system is necessary, and it is not necessary to consider the existence of the FAX relaying server or the network system, and the facsimile image can be sent to the network facsimile device as if it is sent to the normal facsimile machine.

Further, according to the network facsimile system described above, when a facsimile image is transmitted from a predetermined network facsimile device among a plurality of network facsimile devices, if the facsimile image is transmitted to the destination station outside the network facsimile system from the FAX relaying server 1, a telephone number assigned to the predetermined network facsimile device is used without any specific operation therefor. Accordingly, if different network facsimile device is used, although the same relaying server is used, the destination station received the facsimile transmission through a different telephone number. Thus, for the user of the destination station, the network facsimile devices are similar to the normal facsimile machines which have different telephone numbers. Therefore, the user of the outside destination station need not think about the existence of the FAX relaying server 1 or the network system itself, and the facsimile image can be received as if it is transmitted form the normal facsimile machine.

Further, according to the network facsimile device described above, when a user of each hotel room makes the check-in procedure and is allowed to use the network facsimile device implemented in the room, the network facsimile device is configured, in association with the check-in procedure, such that it can transmit/receive facsimile images through the FAX relaying server. Therefore, even if the FAX relaying saver 1 cannot receive the facsimile image, or if the FAX relaying server 1 can receive the facsimile image but the network facsimile device cannot receive the facsimile image before the user is allowed to used the network facsimile device, once the user has finished the check-in procedure and authorized to use the network facsimile device, the user can receive/transmit the facsimile images using the network facsimile device 2.

Second Embodiment

Hereinafter, a network facsimile system according to a second embodiment will be described. Since the configuration of the second embodiment is close to the first embodiment, in the following description, different portions will be described in detail and portions of the second embodiment having the configuration similar to the first embodiment will be omitted.

In the first embodiment, the facsimile data transmitted by the origin station outside the network facsimile system is received by the FAX relaying sever 1, which converts the received facsimile data into an e-mail message and transmits the e-mail message to the network facsimile device 2. Since the FAX relaying server 1 and the network facsimile device 2 can exchange electronic data using a predetermined communication protocol. Therefore, the FAX relaying server 1 and the network facsimile device 2 can exchange data in accordance with a communication protocol other than the e-mail communication protocol.

In the second embodiment, as an example using a protocol other than the e-mail communication protocol for transmitting data, a method using an LPR protocol which is generally used in network printers is used for transmitting the data from the FAX relaying server to the network facsimile device 2 will be described. In this system according to the second embodiment, the FAX relaying server 1 transmits a print request to the network facsimile device 2 using the LPR protocol, while the network facsimile device 2 waits for arrival of the print request using the LPD protocol. With this configuration, the between the FAX relaying server 1 and the network facsimile device 2, a data transmission can be executed.

Figure 22:
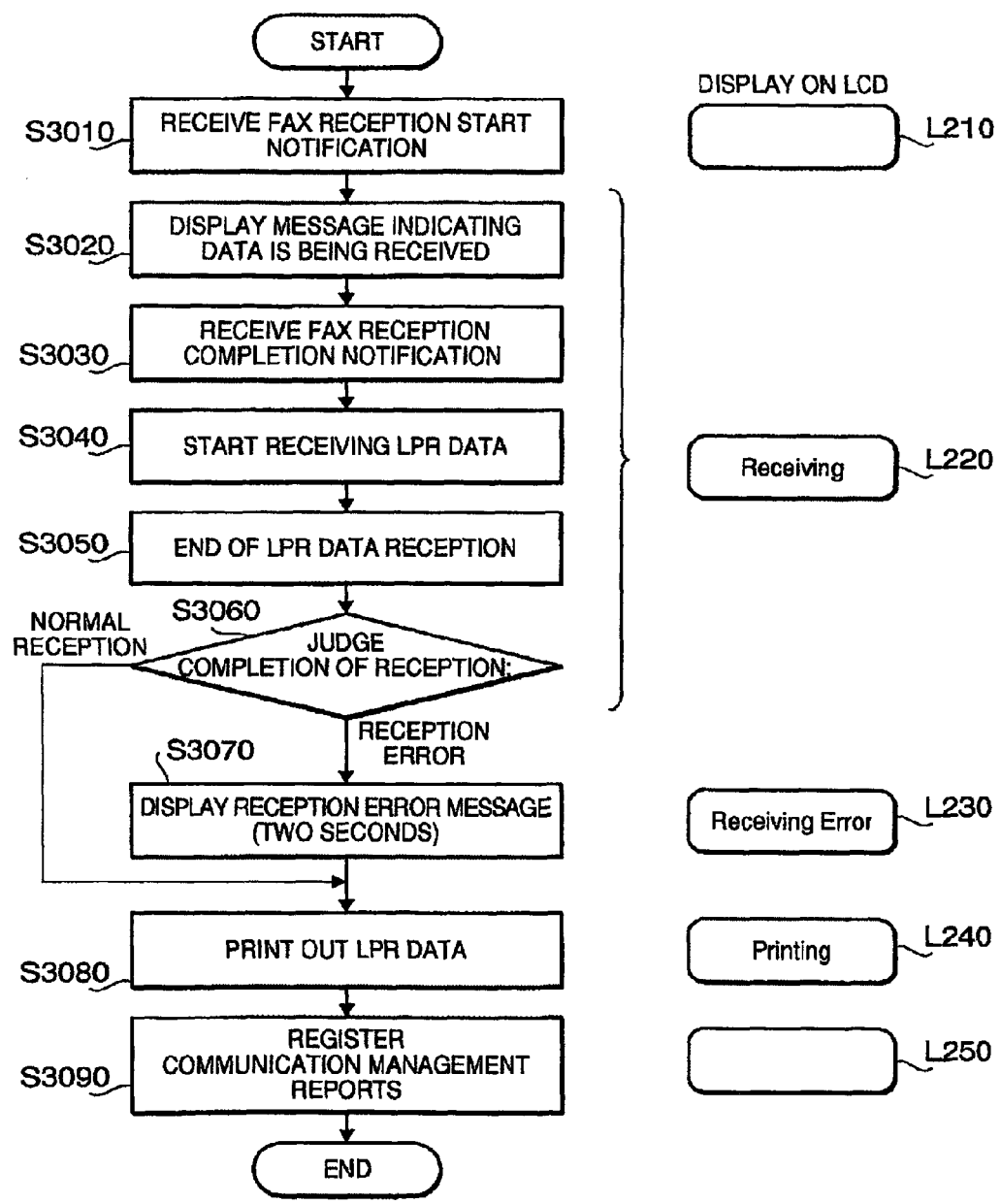
FIG. 22 shows a flowchart illustrating a reception procedure executed by a network facsimile device according to a second embodiment of the invention.

Firstly, referring to FIG. 22, a network facsimile device side receiving procedure will be described. In FIG. 22, corresponding to steps of the flowchart, messages displayed on the LCD 34 are also indicated.

When the network facsimile device side receiving procedure is started, the network facsimile device 2 operates in a stand-by state where it waits for receipt of the facsimile reception start notification from the FAX relaying server 1 (S3010). The FAX reception start notification is similar to the notification which is received by the network facsimile device in S1010 (first embodiment). The user of the network facsimile device 2 that has received the facsimile reception start notification can recognize that the FAX relaying server 1 starts receiving the facsimile data that is transmitted from the origin station outside the network facsimile system. It should be noted that when S3010 is started, no messages are displayed on the LCD 34 (S210).

Next, the network facsimile device 2 displays a message indicating that data is being received (S3020). That is, a message "Receiving" is displayed on the LCD 34 (L220). Next, the network facsimile device operates in a stand-by state where the network facsimile device 2 waits for reception of the FAX reception completion notification from the FAX relaying server 1 (S3030). The facsimile reception completion notification is a notification similar to that the network facsimile device 2 receives in S1050 in the first embodiment. The user of the network facsimile device 2 that has received the facsimile reception completion notification can recognize whether the FAX relaying server 1 has received the data successfully or a reception error has occurred.

Next, the network device 2 waits for the print request using the LPD protocol and start receiving the LPR data transmitted from the FAX relaying server 1 (S3040). When the LPR data is received, the network facsimile device 2 finishes receiving the LPR data (S3050).

Then, in S3060, the network facsimile device 2 judges whether the FAX relaying server 1 has received the facsimile data from the origin station outside the network facsimile system successfully or an error has occurred based on the FAX reception completion notification received in S3030.

If it is determined that the reception error has occurred (S3060: RECEPTION ERROR), the network facsimile device 2 displays an error message for two seconds (S3070). Specifically, on the LCD 34, a message "Receiving Error" is displayed for two seconds (L230).

If it is determined that the facsimile data has been received successfully (S3060: NORMAL RECEPTION), or step S3070 has been finished, the network facsimile device 2 prints out the LPD data (S3080). At this stage, the network facsimile device 2 displays a message "Printing" on the LCD 34 (L240).

Next, regarding the reception of the facsimile data, a communication management report is registered (S3090). At this stage, the network facsimile device 2 turns of the display on the LCD 34 (L250). After S3090 is executed, control finishes the procedure.

Figure 23:
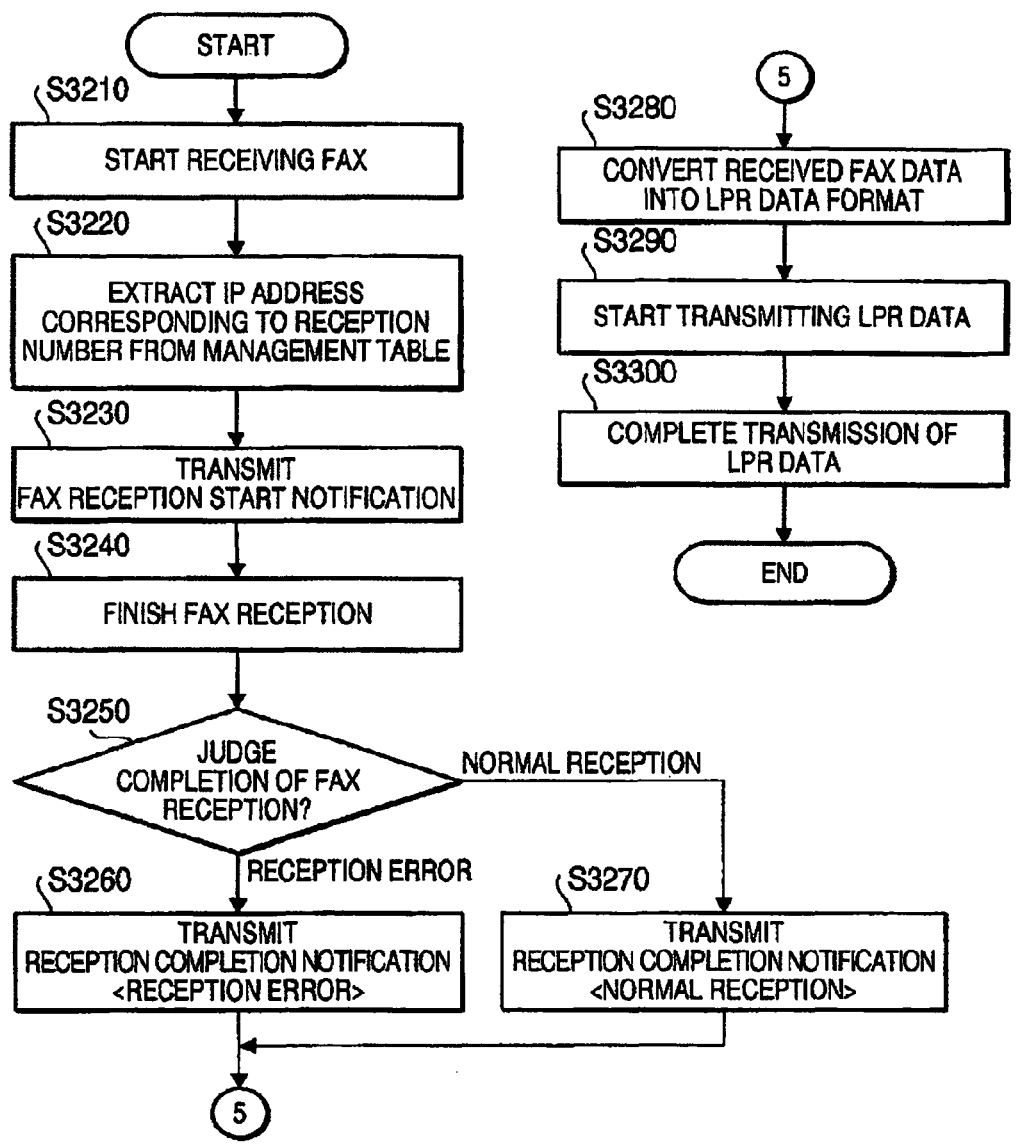
FIG. 23 shows a flowchart illustrating a reception procedure executed by a facsimile relaying server in accordance with aspects of the present invention.

FIG. 23 shows a flowchart illustrating the FAX relaying server side reception procedure. When the FAX relaying server side reception procedure is started, the FAX relaying server 1 starts receiving the facsimile data transmitted form the origin station outside the network facsimile system (S3210).

In parallel with the reception of the facsimile data, the FAX relaying server 1 extracts an e-mail address corresponding to the telephone number of the line through which the facsimile data is being transmitted from the e-mail address management table (S3220). As described above in the first embodiment, the FAX relaying server 1 is capable of using a plurality of lines as connection lines to the PSTN 6, a plurality of telephone numbers being prepared for the plurality of connection lines. When facsimile data is received, one of the plurality of telephone numbers is designated by the origin station outside the network facsimile system, and a call is made to the designated telephone number. In S3220, control searches the e-mail address management table (FIG. 17A) using the telephone number at which the FAX relaying server 1 has received the facsimile data from the origin station outside the network facsimile system to fined the e-mail address corresponding to the telephone number.

Next, the FAX relaying server 1 transmits a FAX reception start notification to the network facsimile device 2 (S3230).

The FAX reception start notification will be received by the network facsimile device 2 in S3010.

While steps S3220-S3230 are executed, the facsimile data is kept received. After completion of the reception, the FAX relaying server 1 finishes the facsimile receiving process (S3250) (S3240). When the facsimile data has been received, the FAX relaying server 1 judges the completion status of the reception of the facsimile data (S3250). If a reception error has occurred (S3250: RECEPTION ERROR), the FAX relaying server 1 transmits the FAX reception completion notification <RECEPTION ERROR> to the network facsimile device 2 (S3260). If the facsimile data has been received successfully (S3250: NORMAL RECEPTION), the FAX relaying server 1 transmits the FAX reception completion notification <NORMAL RECEPTION> to the network facsimile device 2 (S3270). The FAX reception completion notification will be received by the network facsimile device 2 in S3030.

When S3260 or S3270 has been finished, the FAX relaying server 1 converts the received facsimile data into the LPR data (S3280). That is, regardless whether the end status of the reception of the facsimile data is the "normal reception" or "reception error", the received facsimile data is converted into the e-mail format.

Then, the FAX relaying server 1 start transmitting the LPR data using the LPR protocol (S3290). When the LPR data has been transmitted, the FAX relaying server 1 finished is the LPR data transmitting process (S3300). Stops S3290-S3300 correspond to steps S3040-S3050 which are the network facsimile device side processes. When S3300 is finished, control finishes the procedure.

The network facsimile side reception procedure and the FAX relaying server side reception procedure are executed in parallel, thereby the facsimile reception procedure of the network facsimile system according to the embodiment being realized. The network facsimile system receives the facsimile image transmitted from an origin station outside the system to the network facsimile device 2 via the FAX relaying server 1, and prints out the received image.

Third Embodiment

Hereinafter, a network facsimile system according to a third embodiment of the invention will be described. In the third embodiment, the FAX relaying server 1 is configured such that a plurality of facsimile transmission requests from a plurality of network facsimile devices are handled parallelly (i.e., simultaneously).

Specifically, the FAX relaying server 1 employs a multitask OS, and with the function of the multi-task OS, the FAX relaying server 1 is capable of executed a plurality of tasks parallelly in a time-sharing manner. According to the third embodiment, the SMTP reception module 41 (see FIG. 3) is configured to have plurality of similar tasks each executes an e-mail receiving process. With this configuration, the FAX relaying server 1 is capable of receiving a plurality of e-mail messages respectively transmitted from a plurality of network facsimile devices. Further, the FAX communication management module 52 (see FIG. 3) includes a plurality of similar tasks each executing a facsimile transmission process. Thus, a plurality of pieces of facsimile data can be transmitted simultaneously to destinations outside the network facsimile system.

Figure 24:
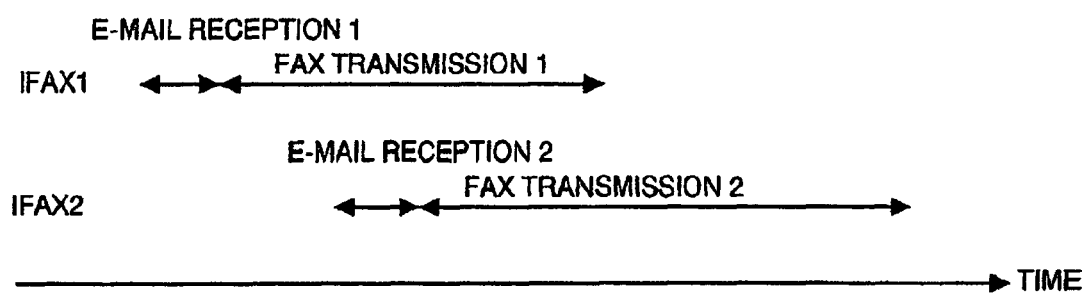
FIG. 24 is a timing chart showing progression of facsimile transmitting procedures according to a third embodiment of the invention.

Since such a configuration is employed, when there is a facsimile transmission request by a first network facsimile device IFAX1 and the FAX relaying server 1 receives an e-mail message from the first network facsimile device IFAX1 (i.e., e-mail 1 in FIG. 24), and thereafter, another facsimile transmission (i.e., FAX transmission 1 in FIG. 24) is to be executed, if another facsimile transmission request is received from a second network facsimile device IFAX2 during the facsimile transmission (i.e., FAX transmission 1 in FIG. 24), the FAX relaying server 1 is capable of receiving the e-mail message from the network facsimile device IPAX2 by creating another task (i.e. e-mail 2 in FIG. 24). Thus, although the FAX relaying server 1 is transmitting facsimile data, the network facsimile device IFAX2 can send the e-mail to the FAX relaying server 1 and completes the transmission.

Further, if the FAX relaying server 1 receives an e-mail message from the network facsimile device IFAX2 (i.e., e-mail 2 in FIG. 24) before the previously started facsimile transmission (i.e., fax 1 in FIG. 24) has not been completed, the FAX relaying server 1 can execute a plurality of facsimile transmitting processes parallelly by creating another task (e.g., fax 1 and fax 2 in FIG. 24).

Figure 25:
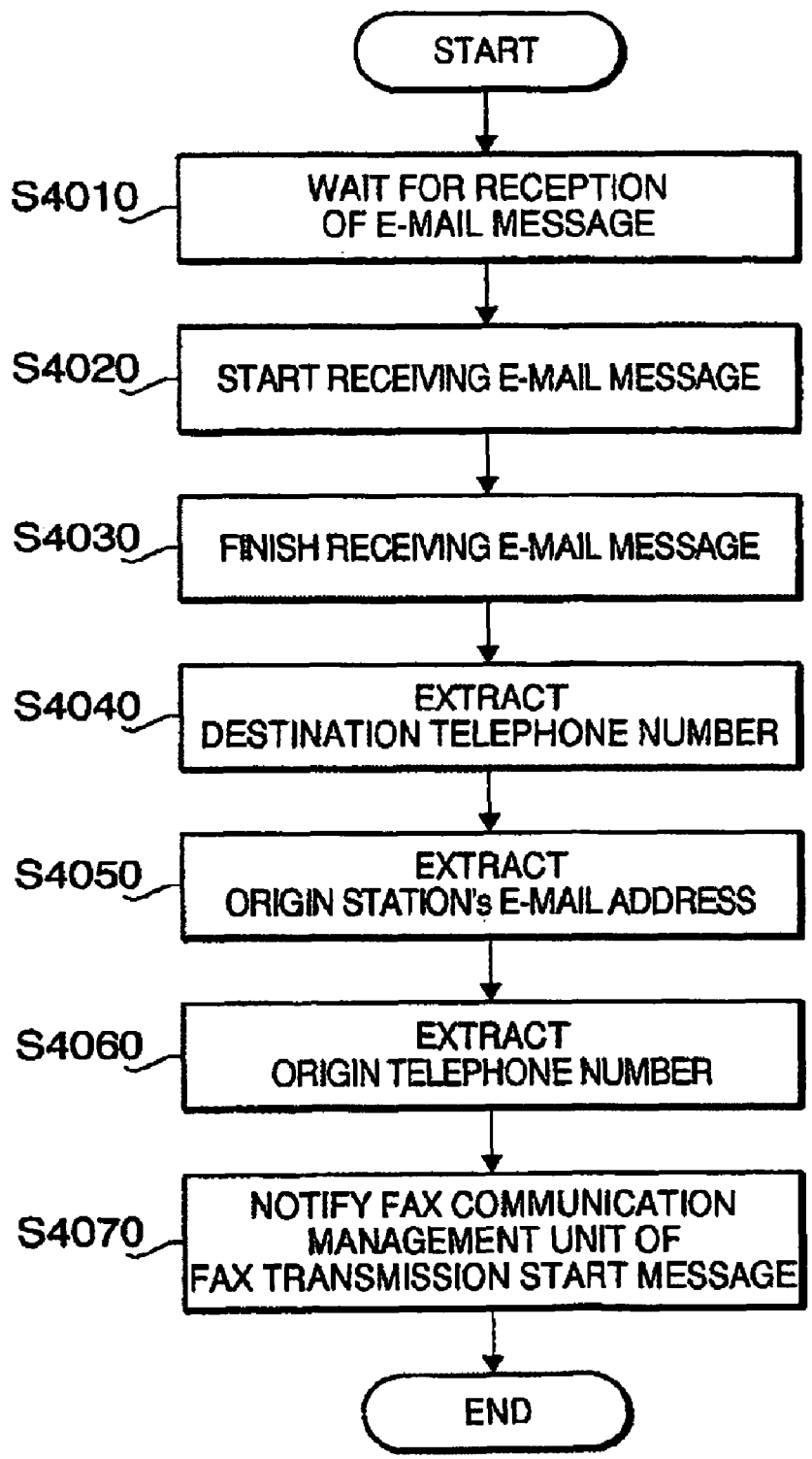
FIG. 25 shows a flowchart illustrating a procedure executed by a task serving as an SMTP reception module in accordance with aspects of the present invention.

Among processes realizing the above system according to the third embodiment, a procedure provided by a task that functions as the SMTP reception module 51 will be described. FIG. 25 shows a flowchart illustrating the procedure executed by the task serving as the SMTP reception module 51.

When the procedure shown in FIG. 25 is started, the task (hereinafter, referred to as an SMTP reception task) functions as the SMTP reception module 51 of the FAX relaying server 1 waits until an e-mail message is transmitted from the network facsimile device 2 using the SMTP (S4010). When the e-mail message has been arrived, the SMTP reception task starts receiving the e-mail message (S4020). When the e-mail message has been received, the task finishes the e-mail receiving process (S4030).

Next, the SMTP reception task extracts the destination telephone number from the received e-mail message (S4040). The SMTP reception task also extracts an e-mail address of the origin station from the received e-mail message (S4050). Then, using the e-mail address as a key, the SMTP reception task searches the e-mail address management table (FIG. 17A) and extracts a telephone number corresponding to the origin station e-mail address as the origin station telephone number (S4060). Steps S4040-54060 are similar to S330-S350 of the first embodiment. The data obtained during execution of S4040-S4060 is stored in the transmission data DB 61, which can be used by a task which functions as the FAX communication management module 52.

The SMTP reception task notifies the facsimile communication management module 52 of the facsimile transmission start MSG (S4070), and finishes the procedure. The FAX transmission start message is information transmitted, using inter-task communication function, to the task functions as the FAX communication management module 52. When the FAX transmission start MSG is received, a task that functions as the FAX communication management module 52 starts the process to be executed.

Figure 26:
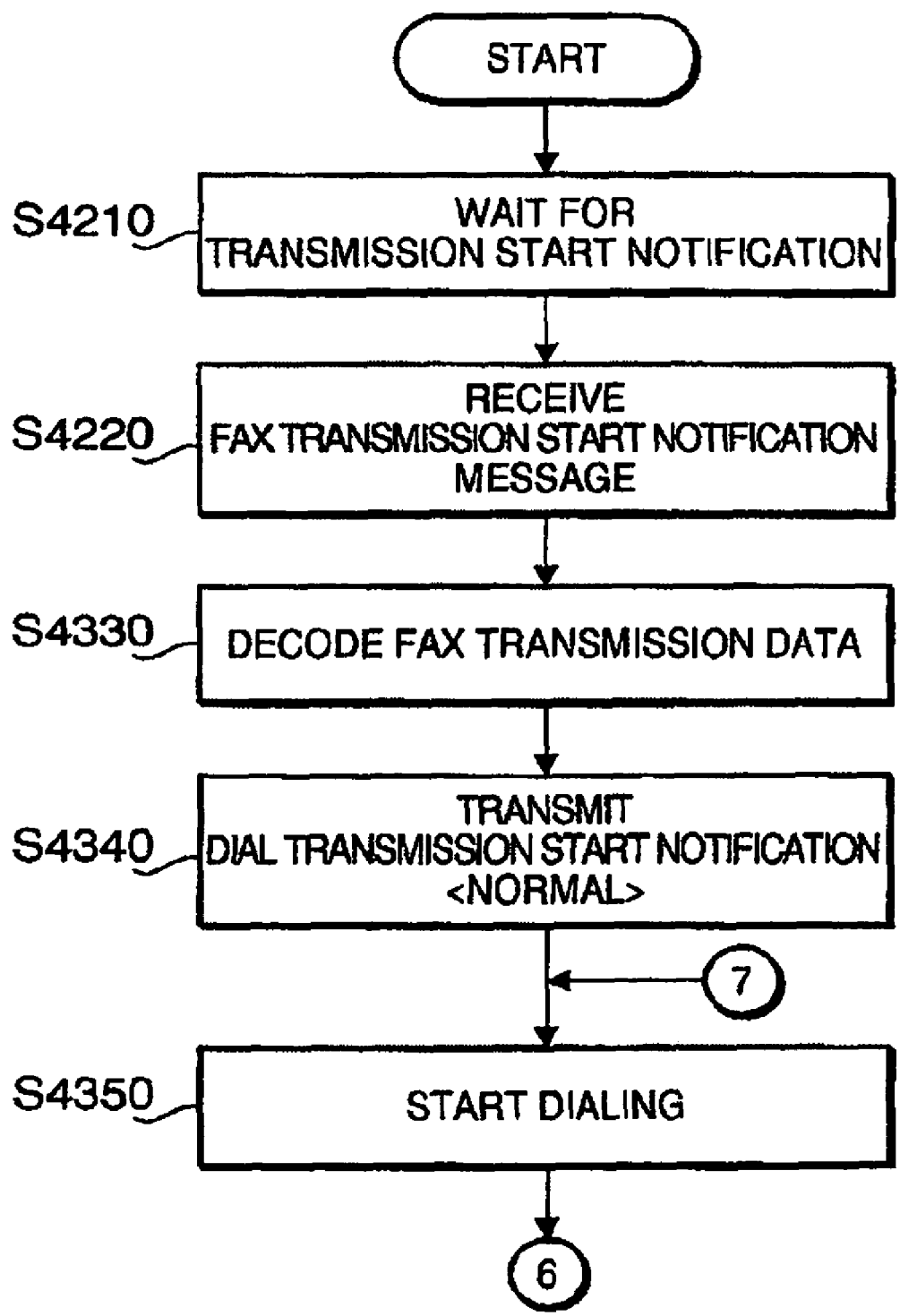
FIGS. 26 and 27 show a flowchart illustrating a procedure executed by a task serving as a facsimile communication management module in accordance with aspects of the present invention.
Figure 27:
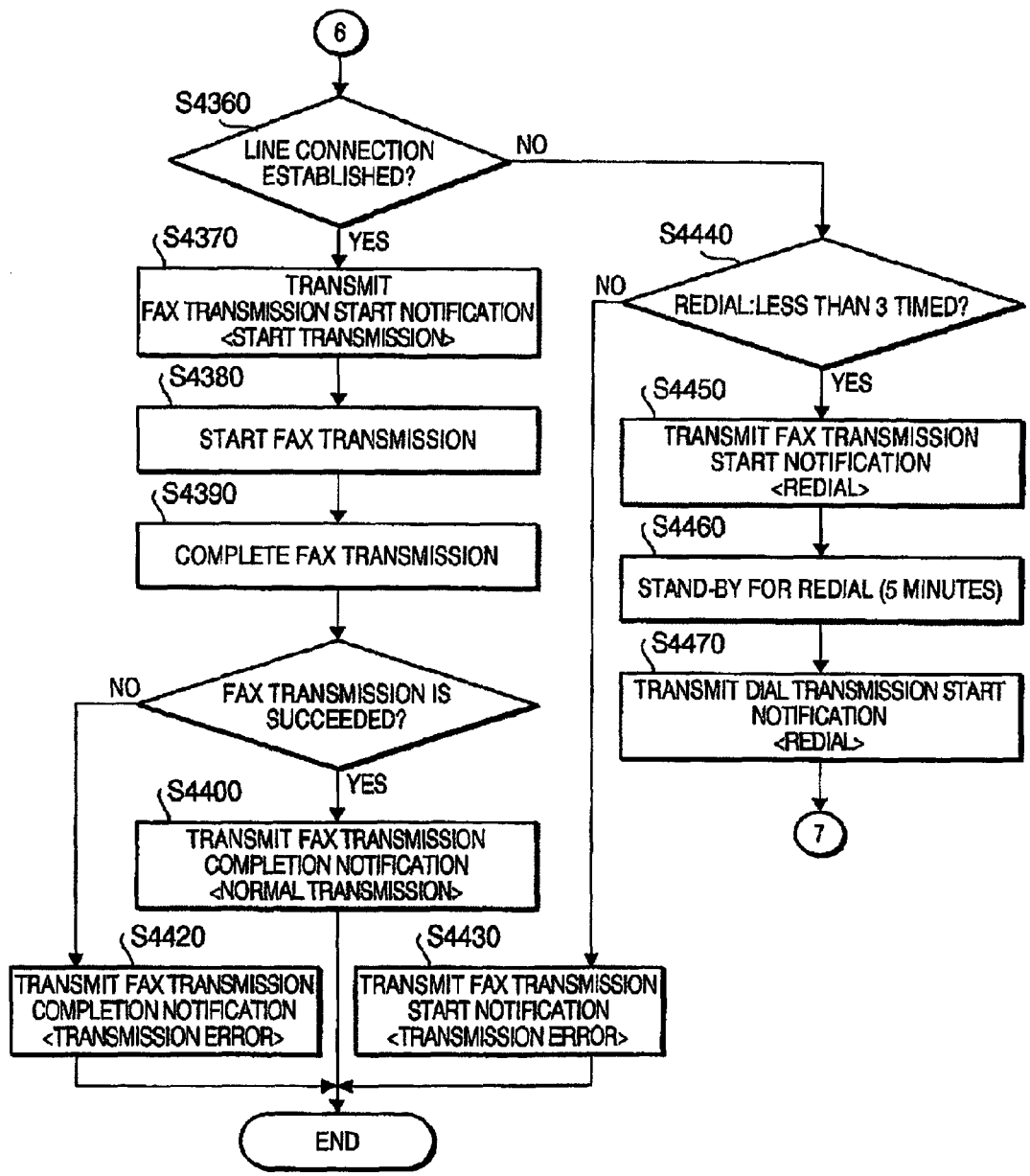

FIGS. 26 and 27 show a flowchart illustrating a procedure executed by a task serving as the facsimile communication management module 52. One of the tasks functioning as the FAX communication management module 52 (hereinafter, referred to as a FAX communication management task) waits until the FAX transmission MSG is notified (S4210). Then, the FAX communication management task receives the FAX transmission start notification MSG (S4220).

Then, the FAX communication management task decodes the facsimile transmission data (S4330), and transmits a dial transmission start notification <NORMAL> to the network facsimile device 2 (S4340).

After transmitting the dial transmission start notification, the FAX communication management task starts dialing (S4350). The FAX relaying server 1 is capable of a plurality of lines as connection lines to the PSTN 6. In this embodiment, one of the plurality of lines is selected such that the origin station telephone number extracted by the SMTP reception task in S4040 is a caller's telephone number, and via the line, and a call is made to the destination station telephone number which has been extracted in S4040 by the SMTP reception task.

Control then proceeds to S4360 (FIG. 27), and the FAX communication management task judges whether the line connection has be completed (S4360). If the FAX communication management task determines that the connection with the destination station outside the network facsimile system has established (S4360: YES), the FAX communication management task transmits the FAX transmission start notification <START TRANSMISSION> to the network facsimile device 2 (S4370).

Then, the FAX communication management task starts the facsimile transmission to the destination station outside the network facsimile system (S4380). When the transmission according to the facsimile communication protocol is finished, the FAX communication management task finishes the facsimile transmission process (S4390). Then, in S4400, the FAX communication management task judges whether the facsimile transmission has finished successfully.

If the facsimile transmission has been finished successfully (S4400: YES), the FAX communication management task transmits the FAX transmission completion notification <NORMAL TRANSMISSION> (S4410), and finishes the procedure. If the facsimile transmission has not successfully finished (S4400: NO), the FAX communication management task transmits the FAX transmission completion notification <TRANSMISSION ERROR> (S4420) and finishes the present procedure.

If it is determined that the connection with the destination station outside the network facsimile system has not been established ( )S4360: NO), control judges whether the number of redialing is less than three (S4440).

If the number of redialing is less than tree (S4440: YES), the FAX communication management task transmits the FAX transmission star notification <redial> to the network facsimile device 2 (S4450). Then, the operational status is changed to the redial stand-by state where the FAX communication management task pauses before the redialing is executed (S4460). When a predetermined period (e.g., five minutes) has elapsed, the FAX communication management task transmits the dial transmission start notification <redial> to the network facsimile device 2 (S4470). After S4470 is finished, control returns to S4350 and restarts dialing.

If the number of redialing is not less than three (S4440: NO), the FAX communication management task transmits the FAX transmission completion notification <transmission error> (S4430), and finishes the current procedure.

With the cooperation of the SMTP reception task and FAX communication management task, the facsimile transmission procedure by the network facsimile system according to the third embodiment is realized, and the facsimile image can be transmitted from the network facsimile device 2 to the destination station outside the network facsimile system via the FAX relaying server 1. In particular, a plurality of SMTP reception tasks and a plurality of FAX communication management tasks are executed in parallel with the multitask function, facsimile images can be transmitted in parallel (i.e., simultaneously) to a plurality of destination stations outside the network facsimile system from a plurality of network facsimile devices via the FAX relaying server.

It should be noted that the embodiments described above are exemplary embodiments and the present invention need not be limited to the configurations of the above-described embodiments. Rather, the above-described configurations can be modified in various ways without departing from the scope of the invention.

For example, in the embodiments, the telephone number of the destination station outside the network facsimile system is described in the "To field" of the e-mail header in order to transmits the telephone number from the network facsimile device 2 to the FAX relaying server 1. The portions at which the destination telephone number is described can be modified in various ways as far as the FAX relaying server can process the modified format. For example, the destination telephone number may be described in the "Subject field" of the e-mail header, or described in the body of the e-mail message.

In the above-described embodiments, between the FAX relaying server and the network facsimile device 2, communication is made by e-mail. However, the invention need not be limited to such a configuration, and any communication protocol which allows the devices to communication through the LAN 4 can be optionally or alternatively employed.

In the above described embodiments, when the telephone number that has not assigned to the network facsimile device 2 (3) is used as the reception telephone number, the call is rejected or the line is cut so that the facsimile transmission is not received. In addition to the rejection/disconnection, a further counter measure may be introduced. For example, it is preferable that the telephone number assigned to the network facsimile device before the check-out procedure is done may be prevented from being assigned to any other network facsimile device predetermined period after the check-out procedure is done. With such a control when a telephone number is assigned to a network facsimile device when the check-in procedure is done, the telephone number can be selected from among the numbers which have not been used for a while. In such a case, even if a facsimile transmission is made to the user who has already made check-out procedure, the facsimile transmission will not received by the network facsimile device assigned to another user. Thus, the privacy of the user who has lady checked out can be held securely. The duration in which the reuse of the telephone number is prevented may; be determined depending on the total number of available telephone numbers and the total number of the network facsimile devices included in the network facsimile system. In view of the protection of privacy, it may be necessary to determine the duration relatively long, and reuse of such a telephone number may be prevented for six months, for example, by setting the status of the telephone number to "busy" or "protected" in the table.

In the embodiments, it is described that the network facsimile devices are general purpose devices so that they can connect to the PSTN 6. It is of course possible to use dedicated facsimile devices without the modem 24 and the circuit control unit 43.

Further, in the embodiments, the connection status is indicated by displaying messages on the LCD 34. Alternatively or optionally, a speaker may be provided to notify the user of the communication status with voice messages or alarm sounds.

Furthermore, in the above described embodiments, as the facsimile devices outside the network facsimile system, G3 facsimile machines 7 and 8 are indicates as examples. Alternatively or optionally, G4 facsimile machines or other type of facsimile machines can be used.

In the above-described embodiments, the network facsimile devices 2 and 3 having fundamental configuration as a facsimile machine are used as the facsimile device of the network facsimile system. However, the invention need not be limited to such a configuration. Any type of device that can function as a communication terminal in the network facsimile system can be used even if it has different configuration in comparison with the facsimile devices 2 and 3. For example, a multifunction device having printer function, scanner function, copier function in addition to the facsimile function may be employed in the network facsimile system as its communication terminal.

Further, in the embodiments, the relaying server extracts the e-mail address or network address of the network facsimile device that receives the facsimile image transmitted to the network facsimile system based on the reception telephone number. The invention can be applied to a system in which the e-mail address or network address is derived based on an dial-in number of ISDN system.

What is claimed is:

1. A network facsimile system which is configured such that an image transmitted from an origin outside the network facsimile system is received by a relaying server, the relaying server being capable of transmitting the image to one of a plurality of communication terminals, the image being transmitted from the origin outside the network facsimile system to the relaying server in accordance with a facsimile communication protocol, the image being transmitted from the relaying server to the communication terminal in accordance with a predetermined communication protocol, the relaying server including:
a facsimile communication system capable of receiving facsimile data representing the image transmitted from the origin outside the network facsimile system;
an image data creating system that creates image data which can be processed by the communication terminal based on the facsimile data received by the facsimile communication system;
a destination identifying system that identifies a communication terminal which is a destination from among the plurality of communication terminals; and
a relaying server side data communication system that transmits the image data created by the image data creating system to the communication terminal identified by the destination identifying system,
the communication terminal including:
a communication terminal side data communicating system that receives the image data transmitted from the relaying server side data communication system; and
an image data processing system that processes the image data received by the communication terminal side data communication system to one of print and store in a storing system,
the network facsimile system including a communication terminal data storing system storing a plurality of pieces of communication terminal data corresponding to the plurality of communication terminals,
the facsimile communication system having a plurality of telephone numbers which are used as receiving telephone numbers when the facsimile data is received and a telephone number assigning system that automatically assigns selected ones of the plurality of telephone numbers to the plurality of communication terminals, respectively, the communication terminal data including the telephone number assigned to each communication terminal being stored in the communication terminal data storing system, the communication terminal data storing system storing the plurality of telephone numbers, selecting unused telephone numbers for each of the automatically assigned telephone numbers and changing their state from an unused state to a used state when they are assigned, transmitting the assigned telephone numbers to the corresponding communication terminals, and changing the state of the assigned telephone numbers back to an unused state upon receipt of an input indicating that usage of the corresponding communication terminal has ended, the destination identifying system detects the communication terminal data including the reception telephone number when the facsimile communication system receives the facsimile data from among the communication terminal data of the plurality of communication terminals, and identifies a communication terminal serving as the destination based on the communication terminal data.

2. The network facsimile system according to claim 1, wherein the communication terminal data storing system stores communication terminal data including e-mail addresses respectively assigned to the plurality of communication terminals, wherein the destination identifying system detects the communication terminal data including the reception telephone number when the facsimile communication system received the facsimile data from among the plurality of pieces of the communication terminal data stored in the communication terminal data storing system, and obtains the e-mail address contained in the detected communication terminal data, and wherein the relaying server side data communication system transmits the image data created by the image data creating system to the e-mail address obtained by the destination identifying system by e-mail.

3. The network facsimile system according to claim 2, wherein the relaying server includes an e-mail address assigning system, the e-mail address assigning system operates, when a communication terminal to which an e-mail address is to be assigned is available, to extract one e-mail address from among a plurality of e-mail addresses prepared for assigning to the plurality of communication terminals, the e-mail address assigning system assigning the extracted e-mail address to the communication terminal by storing the extracted e-mail address in the communication terminal data corresponding to the communication terminal to which the e-mail address is to be assigned.

4. The network facsimile system according to claim 3, wherein the relaying server includes an e-mail address usage storing system that stores whether a plurality of e-mail addresses assigned to the plurality of communication terminals are usable, respectively, wherein the e-mail address assigning system extracts one e-mail address from among the e-mail addresses which are indicated usable in the e-mail address usage storing system, and stores the extracted e-mail address in the communication terminal data corresponding to the selected communication terminal to assign the extracted e-mail address to the selected communication terminal.

5. The network facsimile system according to claim 4, wherein the e-mail address assigning system stores, when the e-mail address is assigned to the communication terminal, an unusable state of the e-mail address as assigned in the e-mail address usage storing system.

6. The network facsimile system according to claim 4, wherein the e-mail address assigning system stores, when the assignment of the e-mail address to a communication terminal is released, a usable state of the e-mail address in the e-mail address usage storing system.

7. The network facsimile system according to claim 3, wherein the relaying server includes a communication terminal availability judging system that judges whether each communication terminal is available, and wherein the e-mail address assigning system assigns the e-mail address to each communication terminal that is determined to be available by the communication terminal availability judging system.

8. The network facsimile system according to claim 7, wherein the relaying server includes a start-up detection system that detects a start-up of the communication terminal, and wherein the communication terminal availability judging system judges that a communication terminal is usable when the start-up of the communication terminal is detected by the start-up detection system.

9. The network facsimile system according to claim 7, wherein the communication terminal data storing system stores a plurality of pieces of communication terminal data including location data indicating locations of the plurality of communication terminals, respectively, wherein the relaying server includes a location availability setting system capable of setting the availability of the locations of the plurality of communication terminals, respectively, wherein the communication terminal usage judging system determines that, when a location of a communication terminal is set to be occupied by the location availability setting system, the communication terminal at the location becomes usable, wherein the e-mail address assigning system detects, based on the location data indicating the communication terminal which is determined to be usable by the communication terminal usage judging system, the communication terminal data including the location data from among the plurality of pieces of communication terminal data stored in the communication terminal data storing system, and assigns an e-mail address to the communication terminal by storing the extracted e-mail address in the communication terminal data.

10. The network facsimile system according to claim 3, wherein the relaying server includes a communication terminal unavailability judging system that judges whether each communication terminal is not being used, wherein the e-mail address assigning system detects the communication terminal data corresponding to the communication terminal which is determined not to be used by the communication terminal unavailability judging system from among the plurality of pieces of the communication terminal data stored in the communication terminal data storing system, and releases the assignment of the e-mail address to the communication terminal by invalidating the stored e-mail address in the detected communication terminal data.

11. The network facsimile system according to claim 3, wherein the communication terminal data storing system stores a plurality of pieces of communication terminal data including location data indicating locations of the plurality of communication terminals, respectively, wherein the relaying server includes a location availability setting system capable of setting the availability of the locations of the plurality of communication terminals, respectively, wherein the communication terminal usage judging system determines that, when a location of a communication terminal is set to be unoccupied by the location availability setting system, the communication terminal at the location becomes unused, wherein the e-mail address assigning system detects, based on the location data indicating the communication terminal which is determined to be unused by the communication terminal usage judging system, the communication terminal data including the location data from among the plurality of pieces of communication terminal data stored in the communication terminal data storing system, and releases the e-mail address assigned to the communication terminal by invalidating the e-mail address in the detected communication terminal data.

12. The network facsimile system according to claim 3, wherein the relaying server includes an e-mail address notifying system, and wherein, when the e-mail address assigning system assigns an e-mail address to the communication terminal, the e-mail address notifying system notifies the communication terminal to which the e-mail address is assigned of the assigned e-mail address.

13. The network facsimile system according to claim 3, wherein the relaying server includes an e-mail address release notifying system, and wherein, when the e-mail address assigned to the communication terminal is released, the e-mail address release notifying system notifies the communication terminal subject to the release of the e-mail address of the release of the e-mail address.

14. The network facsimile system according to claim 1, wherein the communication terminal data storing system stores communication terminal data including network addresses respectively assigned to the plurality of communication terminals, wherein the destination identifying system detects the communication terminal data including the reception telephone number when the facsimile communication system received the facsimile data from among the plurality of pieces of the communication terminal data stored in the communication terminal data storing system, and obtains the network address contained in the detected communication terminal data, and wherein the relaying server side data communication system transmits the image data created by the image data creating system to the network address obtained by the destination identifying system in accordance with a packet communication protocol.

15. The network facsimile system according to claim 1, wherein the communication terminal data storing system is provided to the relaying server.

16. The network facsimile system according to claim 1, wherein the changing from the unused state to the used state corresponds to a check-in for a room where the communication terminal is located, and transition from the used state to the unused state corresponds to a check-out for a room where the communication terminal is located.

17. A network facsimile system having a plurality of communication terminals and relaying server, the relaying server receiving an image transmitted from one of the plurality of communication terminals, the relaying server being capable of transmitting the received image to a destination outside the network facsimile system, the one of the plurality of communication terminals transmitting the image to the relaying server in accordance with a predetermined communication protocol, the relaying server transmitting the image to the destination outside the network facsimile system in accordance with a facsimile transmission protocol, wherein each of the communication terminal includes:
an image data creating system that creates image data representing the image to be transmitted; and
a communication terminal side data communication system that transmits the image data created by the image data creating system to the relaying server, wherein the relaying server includes:
a relaying server side data communication system that receives the image data transmitted from the communication terminal side data communication system;
a facsimile data creating system that creates facsimile data to transmit the image in accordance with the facsimile communication protocol based on the image data received by the relaying server side data communication system; and
a facsimile communication system that transmits the facsimile data created by the facsimile data creating system to the destination outside the network facsimile system in accordance with the facsimile communication protocol, wherein the network facsimile system includes a communication terminal data storing system that stores a plurality of pieces of communication terminal data respectively corresponding to the plurality of communication terminals, wherein the facsimile communication system includes a plurality of telephone numbers used as transmitting station numbers when the facsimile data is transmitted, and a telephone number assigning system that automatically assigns selected numbers of the plurality of telephone numbers to the plurality of communication terminals, respectively, each of the plurality of pieces of the communication terminal data containing the telephone number assigned to each communication terminal is stored in the communication terminal data storing system, wherein the relaying server is provided with a telephone number extracting system that detects the communication terminal data corresponding to the communication terminal that is an origin of the image data received by the relaying server side data communication system from among the plurality of pieces of communication terminal data stored in the communication terminal storing system, and then extracts a telephone number from the communication terminal data as detected, wherein the communication terminal data storing system stores the plurality of telephone numbers, selects unused telephone numbers for each of the automatically assigned telephone numbers and changes their state from an unused state to a used state when they are assigned, transmits the assigned telephone numbers to the corresponding communication terminals, and changes the state of the assigned telephone numbers back to an unused state upon receipt of an input indicating that usage of the corresponding communication terminal has ended, and wherein the facsimile communication system transmits the facsimile data created by the facsimile data creating system to the destination outside the network facsimile system using the telephone number extracted by the telephone number extracting system from among the plurality of telephone numbers the facsimile communication system includes as the transmitting station number in accordance with the facsimile communication protocol.

18. The network facsimile system according to claim 17, wherein the communication terminal data storing system stores communication terminal data including e-mail addresses respectively assigned to the plurality of communication terminals,
wherein the telephone number extracting system extracts the origin station e-mail address of the e-mail when the relaying server side data communication system receives the image data transmitted from the communication terminal in accordance with the e-mail communication protocol, detects the communication terminal data including the extracted origin station e-mail address from the plurality of pieces of communication terminal data stored in the communication terminal data storing system, and extracts the telephone number contained in the detected communication terminal data.

19. The network facsimile system according to claim 17, wherein the facsimile communication system is configured such that, if the image data is transmitted from more than one communication terminals and the facsimile data creating system creates more than one piece of facsimile data, the facsimile communication system executes data transmitting procedures for transmitting the more than one piece of facsimile data in parallel.

20. The network facsimile system according to claim 19, wherein the relaying server side data communication system is configured such that, if the image data is transmitted from more than one communication terminal, the relaying server side data communication system executes data receiving procedures for the more than one piece of image data in parallel.

21. The network facsimile system according to claim 17, wherein the relaying server includes a telephone number assigning system that assigns a telephone number to the communication terminal by extracting one telephone number from the plurality of telephone numbers the facsimile communication system includes, and storing the extracted telephone number in a piece of communication terminal data corresponding to the communication terminal subject to the assignment if there is a communication terminal to which the telephone number is assigned.

22. The network facsimile system according to claim 21, wherein the relaying server includes a telephone number availability storing system that stores the availability of each of the telephone numbers the facsimile communication system includes, and
wherein the telephone number assigning system extracts one of the telephone numbers, which are included in the facsimile communication system and whose availabilities in the availability stored in the telephone number availability storing system are available, and assigns the selected one of the telephone numbers to the selected communication terminal by storing the selected one of the telephone numbers in the piece of the communication terminal data corresponding to the selected communication terminal.

23. The network facsimile system according to claim 22, wherein the telephone number assigning system stores unavailability of the telephone number assigned to the selected communication terminal in the telephone number availability storing system when the telephone number is assigned to the communication terminal.

24. The network facsimile system according to claim 22, wherein, when an assignment of a telephone number to a communication terminal is released, the telephone number assigning system stores availability of the released telephone number after the assignment is released.

25. The network facsimile system according to claim 21, wherein the relaying server includes a communication terminal availability judging system that judges whether each communication terminal is usable, and
wherein the telephone number assigning system assigns a telephone number to the communication terminal which is judged to be usable by the communication terminal availability judging system.

26. The network facsimile system according to claim 25, wherein the relaying server includes a usage detecting system that detects a start-up of each communication terminal, and
wherein the communication terminal availability judging system determines that a communication terminal becomes usable when the start-up detecting system detects the start-up of the communication terminal.

27. The network facsimile system according to claim 25, wherein the communication terminal data storing system stores a plurality of pieces of communication terminal data including location data indicating locations of the plurality of communication terminals, respectively,
wherein the relaying server includes a location availability setting system capable of setting the availability of the locations of the plurality of communication terminals, respectively,
wherein the communication terminal usage judging system determines that, when a location of a communication terminal is set to be occupied by the location availability setting system, the communication terminal at the location becomes usable,
wherein the telephone number assigning system detects, based on the location data indicating the communication terminal which is determined to be usable by the communication terminal usage judging system, the communication terminal data including the location data from among the plurality of pieces of communication terminal data stored in the communication terminal data storing system, and assigns a telephone number to the communication terminal by storing the extracted telephone number in the communication terminal data.

28. The network facsimile system according to claim 21, wherein the relaying server includes a communication terminal unavailability judging system that judges whether each communication terminal is not being used,
wherein the telephone number assigning system detects the communication terminal data corresponding to the communication terminal which is determined not to be used by the communication terminal unavailability judging system from among the plurality of pieces of the communication terminal data stored in the communication terminal data storing system, and releases the assignment of the telephone number to the communication terminal by invalidating the stored telephone number in the detected communication terminal data.

29. The network facsimile system according to claim 28, wherein the communication terminal data storing system stores a plurality of pieces of communication terminal data including location data indicating locations of the plurality of communication terminals, respectively,
wherein the relaying server includes a location availability setting system capable of setting the availability of the locations of the plurality of communication terminals, respectively,
wherein the communication terminal usage judging system determines that, when a location of a communication terminal is set to be unoccupied by the location availability setting system, the communication terminal at the location becomes unused, wherein the telephone number assigning system detects, based on the location data indicating the communication terminal which is determined to be unused by the communication terminal usage judging system, the communication terminal data including the location data from among the plurality of pieces of communication terminal data stored in the communication terminal data storing system, and releases a telephone number assigned to the communication terminal by invalidating the telephone number in the detected communication terminal data.

30. The network facsimile system according to claim 17, wherein the changing from the unused state to the used state corresponds to a check-in for a room where the communication terminal is located, and transition from the used state to the unused state corresponds to a check-out for a room where the communication terminal is located.

* * * * *